US008734226B2

(12) United States Patent
Heaton et al.

(10) Patent No.: US 8,734,226 B2
(45) Date of Patent: May 27, 2014

(54) SYSTEMS AND METHODS FOR ASSISTING IN GAME PLAY AND WAGERING

(75) Inventors: Timothy H Heaton, Morristown, NJ (US); Howard W Lutnick, New York, NY (US)

(73) Assignee: BGC Partners, Inc., New York, NY (US)

( * ) Notice: Subject to any disclaimer, the term of this patent is extended or adjusted under 35 U.S.C. 154(b) by 0 days.

(21) Appl. No.: 10/287,332

(22) Filed: Nov. 1, 2002

(65) Prior Publication Data

US 2003/0109310 A1 Jun. 12, 2003

Related U.S. Application Data

(60) Provisional application No. 60/339,914, filed on Dec. 12, 2001.

(51) Int. Cl.
*A63F 9/24* (2006.01)
*A63F 13/00* (2006.01)

(52) U.S. Cl.
USPC .................. 463/25; 463/26; 463/27; 463/28; 463/29; 463/42; 273/138.1; 273/138.2; 273/143 R

(58) Field of Classification Search
USPC ................ 463/1–9, 11–29, 40–42; 273/32 R, 273/143 R, 138, 138.1–138.2; 364/410
See application file for complete search history.

(56) References Cited

U.S. PATENT DOCUMENTS

| | | | |
|---|---|---|---|
| 3,689,071 A | 9/1972 | Kucera | |
| 3,909,002 A * | 9/1975 | Levy | 463/26 |
| 3,962,800 A | 6/1976 | Feldheim | |
| 4,014,549 A | 3/1977 | Cywar | |
| 4,052,073 A | 10/1977 | Miller | |
| 5,100,326 A | 3/1992 | Leep et al. | |
| 5,127,651 A * | 7/1992 | Okada | 273/143 R |
| 5,265,009 A | 11/1993 | Colavita | |
| 5,297,802 A * | 3/1994 | Pocock et al. | 463/19 |

(Continued)

FOREIGN PATENT DOCUMENTS

| | | |
|---|---|---|
| EP | 0850673 | 7/1998 |
| EP | 0850673 A1 | 7/1998 |
| EP | 1 319 428 A2 | 6/2003 |
| GB | 2355627 A | 4/2001 |
| GB | 2 399 299 A | 9/2004 |

(Continued)

OTHER PUBLICATIONS

U.S. Appl. No. 60/339,914, filed Dec. 12, 2001, Lutnick.

(Continued)

*Primary Examiner* — Dmitry Suhol
*Assistant Examiner* — Ryan Hsu
(74) *Attorney, Agent, or Firm* — Thomas D. Bradshaw

(57) ABSTRACT

Systems and methods for assisting game play and wagering are provided. A game assistant system may provide a user with advice on game play or wagering for casino games such as blackjack, roulette, poker, craps, slots, or baccarat. The game assistant may also provide a user with advice on wagering events (e.g., horse racing, etc.) or on other games (e.g., backgammon, chess, etc.). The information provided by the game and wagering assistant during game play or a wagering event may allow a user to minimize losses or the statistical advantage of a casino or game provider. The game and wagering assistant system may also allow a user to allocate a particular amount of money for wagering on games or events, and allow the user to control the rate at which the money is expended.

25 Claims, 14 Drawing Sheets

(56) References Cited

U.S. PATENT DOCUMENTS

| | | | | | |
|---|---|---|---|---|---|
| 5,324,035 | A * | 6/1994 | Morris et al. | ................... | 463/42 |
| 5,333,868 | A * | 8/1994 | Goldfarb | .......................... | 463/18 |
| 5,432,932 | A * | 7/1995 | Chen et al. | .................... | 718/103 |
| 5,507,485 | A * | 4/1996 | Fisher | ........................... | 473/407 |
| 5,573,249 | A | 11/1996 | Johnson | | |
| 5,628,511 | A | 5/1997 | Jacoby | | |
| 5,630,753 | A | 5/1997 | Fuchs | | |
| 5,702,303 | A * | 12/1997 | Takemoto et al. | .............. | 463/27 |
| 5,816,918 | A * | 10/1998 | Kelly et al. | ..................... | 463/16 |
| 5,893,064 | A * | 4/1999 | Kudirka et al. | ............ | 704/270.1 |
| 5,895,048 | A | 4/1999 | Smith, Jr. | | |
| 5,910,048 | A * | 6/1999 | Feinberg | ......................... | 463/25 |
| 6,003,013 | A * | 12/1999 | Boushy et al. | .................. | 705/10 |
| 6,007,426 | A * | 12/1999 | Kelly et al. | ..................... | 463/16 |
| 6,062,979 | A | 5/2000 | Inoue | | |
| 6,068,552 | A * | 5/2000 | Walker et al. | ................... | 463/21 |
| 6,113,102 | A | 9/2000 | Marks et al. | | |
| 6,131,906 | A | 10/2000 | Green | | |
| 6,267,671 | B1 * | 7/2001 | Hogan | ............................ | 463/25 |
| 6,273,820 | B1 * | 8/2001 | Haste, III | ........................ | 463/40 |
| 6,293,866 | B1 * | 9/2001 | Walker et al. | ................... | 463/20 |
| 6,302,793 | B1 * | 10/2001 | Fertitta et al. | ................... | 463/25 |
| 6,315,662 | B1 | 11/2001 | Jorasch et al. | | |
| 6,319,125 | B1 | 11/2001 | Acres | | |
| 6,485,367 | B1 * | 11/2002 | Joshi | ............................... | 463/13 |
| 6,508,709 | B1 * | 1/2003 | Karmarkar | ...................... | 463/42 |
| 6,605,003 | B2 * | 8/2003 | Suchocki et al. | ............... | 463/29 |
| 6,634,942 | B2 * | 10/2003 | Walker et al. | ................... | 463/20 |
| 6,651,985 | B2 | 11/2003 | Sines et al. | | |
| 6,679,497 | B2 | 1/2004 | Walker et al. | | |
| 6,682,421 | B1 * | 1/2004 | Rowe et al. | ..................... | 463/25 |
| 6,726,427 | B2 | 4/2004 | Jarvis et al. | | |
| 6,793,575 | B2 | 9/2004 | Brown et al. | | |
| 6,852,030 | B2 | 2/2005 | Baerlocher et al. | | |
| 6,966,832 | B2 | 11/2005 | Leen et al. | | |
| 6,991,544 | B2 * | 1/2006 | Soltys et al. | .................... | 463/42 |
| 7,008,320 | B2 * | 3/2006 | Rowe et al. | ..................... | 463/25 |
| 7,029,394 | B2 | 4/2006 | Leen et al. | | |
| 7,175,179 | B2 | 2/2007 | Marks et al. | | |
| 2001/0000778 | A1 | 5/2001 | Sines et al. | | |
| 2001/0009867 | A1 | 7/2001 | Sakaguchi et al. | | |
| 2001/0031654 | A1 | 10/2001 | Walker et al. | | |
| 2001/0039205 | A1 | 11/2001 | Adams et al. | | |
| 2002/0149590 | A1 | 10/2002 | Townsend | | |
| 2002/0187834 | A1 * | 12/2002 | Rowe et al. | ..................... | 463/42 |
| 2003/0013516 | A1 * | 1/2003 | Walker et al. | ................... | 463/25 |
| 2003/0036422 | A1 | 2/2003 | Baerlocher et al. | | |
| 2003/0045358 | A1 | 3/2003 | Leen et al. | | |
| 2004/0053680 | A1 | 3/2004 | Schultz | | |
| 2005/0102131 | A1 | 5/2005 | Trower et al. | | |
| 2006/0148551 | A1 | 7/2006 | Walker et al. | | |
| 2006/0247042 | A1 | 11/2006 | Walker et al. | | |

FOREIGN PATENT DOCUMENTS

| | | | |
|---|---|---|---|
| JP | 2010015247 | | 1/1998 |
| JP | H11-47355 | | 2/1999 |
| JP | 2000181897 | A | 6/2000 |
| JP | 2000510352 | | 8/2000 |
| JP | 2001029649 | A | 2/2001 |
| WO | WO 94/01840 | | 1/1994 |
| WO | WO-95/31264 | A1 | 11/1995 |
| WO | WO 95/31264 | A1 | 11/1995 |
| WO | WO 97/26061 | | 8/2000 |
| WO | WO-01/53927 | A1 | 7/2001 |
| WO | WO 01/53927 | A1 | 7/2001 |
| WO | WO 03/007254 | A2 | 1/2003 |
| WO | WO 03/049829 | A1 | 6/2003 |

OTHER PUBLICATIONS

USPTO Office Action for U.S. Appl. No. 11/032,724, dated Apr. 5, 2006 (18 pages).

USPTO Notice of Allowance for U.S. Appl. No. 11/032,724, dated Sep. 25, 2008 (6 pages).

USPTO Office Action for U.S. Appl. No. 11/032,724, dated Dec. 28, 2007 (10 pages).

USPTO Office Action for U.S Appl. No. 11/032,724, dated Oct. 25, 2007 (3 pages).

USPTO Office Action for U.S. Appl. No. 11/032,724, dated Jul. 23, 2007 (12 pages).

USPTO Office Action for U.S. Appl. No. 11/032,724, dated Apr. 25, 2007 (11 pages).

DeepNet technologies website at http://deepnettech.com/blackjack.html, dated Feb. 5, 2002, retrieved Apr. 18, 2007 from the internet, 9 pages.

Unknown, "Blackjack", via www.wikipedia.com (online), Dec. 4, 2003. (retrieved on Apr. 3, 2006. Retrieved from the Internet: <URL:http://en.wikipedia.org/wiki/Blackjack>.

Winning Blackjack Pictures from actual game play, 9 pages of Game version 1.0, copyright 2001 downloaded Apr. 18, 2007, from <http://www.winsite.com/bin/Info?2000000035531>.

WinSite.com (Winning Blackjack game info), retrieved from the internet Jul. 5, 2007 at <http://www.winsite.com/bin/info?2000000035531>.

Paul, Fredric, "Beat the House," Electronic Entertainment, Interplay Products, vol. 2, No. 6, Jun. 1995, p. 88.

Roginski, T,C., "Blackjack Royale Version 2.0 Is a Royal Blackjack Trainer" Rainbow Dec. 1984. vol. 4 No. 5, p. 217 Abstract Only.

Roginski, T.C., Blackjaq: A Blackjack Trainer', Rainbow, Nov. 1983, vol. 3, No. 4 p. 250, Abstract Only.

Unknown, "Blackjack Trainer—Blackjack Training Program," vol. 10, No. 10, British Library, MacWorld, Oct. 1, 1993, p. 85.

Berte, Stephen, "The Serious Blackjack Tutor," PCM, vol. 8, No. 6, Dec. 1, 1990 p. 79-80.

Unknown, "Beat the Casino 2004: How to Win at Blackjack and Other Casino Games" Newswire Association, LLC Jun. 22, 2004.

Canadian Office Action for Application No. 2,470,117 dated Jul. 18, 2011 (4 pages).

Great Britain Office Action for Application No. 0415431.6 dated Jul. 21, 2006 (2 pages).

Great Britain Office Action for Application No. 0415431.6 dated Dec. 19, 2005 (2 pages).

International Search Report for International Application No. PCT/US02/39554 mailed Feb. 28, 2003 (4 pages).

Australian Examiner's Report for Application No. 2006206764, dated Aug. 12, 2010 (2 pages).

European Communication and Extended Search Report for Application No. EP 06717981.2, mailed Jul. 11, 2011 (5 pages).

Japanese Office Action with English Translation for Application No. 2007-550567, mailed Nov. 22, 2011 (8 pages).

International Search Report for International Application No. PCT/US06/000848 mailed Jun. 27, 2006 (4 pages).

Canadian Office Action for Application No. 2,470,117 dated May 22, 2012 (4 pages).

USPTO Office Action for Application No. 13/481,096, dated Apr. 2, 2013 (20 pages).

PCT Written Opinion of the International Searching Authority for International Application No. PCT/US06/000848 mailed Jun. 27, 2006 (8 pages).

Australian Examiner's Report for Application No. 2012202770, dated Nov. 29, 2013 (3 pages).

Canadian Examiner's Report for Application No. 2,593,754, dated Oct. 17, 2013 (3 pages).

European Communication for Application No. 06717981.2, dated May 17, 2013 (5 pages).

Japanese Office Action with English Translation for Application No. 2007-550567, mailed Aug. 7, 2012 (4 pages).

Japanese Office Action with English Translation for Application No. 2007-550567, mailed Jul. 2, 2013 (7 pages).

"Dark-Side Techniques for Making Money on the Net", PC Japan, Softbank Publishing Corp. 1 Oct. 2003, vol. 8 (10): 145-149.

USPTO Office Action for U.S. Appl. No. 12/249,249, dated Dec. 20, 2010 (15 pages).

USPTO Notice of Allowance for U.S. Appl. No. 12/249,249, dated Oct. 3, 2011 (9 pages).

USPTO Notice of Allowance for U.S. Appl. No. 12/249,249, dated Feb. 3, 2012 (6 pages).

* cited by examiner

SYSTEMS AND METHODS FOR ASSISTING IN GAME PLAY AND WAGERING

CROSS-REFERENCE TO RELATED APPLICATION

This application claims the benefit of U.S. provisional application No. 60/339,914 filed Dec. 12, 2001 which is hereby incorporated by reference herein in its entirety.

BACKGROUND OF THE INVENTION

The present invention relates to systems and methods for assisting in game play and wagering. More particularly, the present invention relates to systems and methods for providing players of casino games or other games, as well as individuals participating in wagering events, with playing advice, probabilities information, statistical analysis, and wagering information to optimize game play and wagering decision making.

Blackjack, poker, craps, roulette, slots, baccarat and other such games are generally known as casino games since such games have been played at casinos. More recently, such casino games, as well as traditional games (e.g., chess, backgammon, etc.) and wagering events have been played on computers with game or wagering event software, on the Internet, or by using dedicated electronic machines.

Casino games involve decision-making regarding game play and wagering amounts. Such decisions affect a player's odds of winning or losing, as well as the wager amount gained or lost. Depending on the game played, as well as the table rules, the casino or game provider typically has a predetermined advantage over a player. During the course of playing a casino game, a player may have difficulty making decisions that minimize the advantage of the casino or game provider, minimize losses, or maximize gains.

Typically, a player competes in multiple rounds of a casino game. Thus, the player needs to make decisions regarding play and wagering over a series of rounds of a particular game to minimize the player's potential losses.

Similarly to casino games, traditional games such as chess and backgammon involve decision making and strategy. Wagering can occur between players of such games. In addition, wagering events such as horse racing typically involve use of information and statistics for wagering purposes.

Accordingly, it is desirable to provide systems and methods for providing advice or information in playing or wagering decisions for electronic, on-line, or table casino games, traditional games, and wagering events.

SUMMARY OF THE INVENTION

The present invention relates to systems and methods for providing advice, statistical information, and wagering advice related to casino game play, traditional game play, and wagering events.

A computing device, software, or any suitable combination thereof may provide a game and wagering assistant system that provides advice during the play of a casino game, traditional game, or wagering event. For example, the system may provide advice for casino games such as blackjack, poker, roulette, slots, craps, baccarat or any other suitable game. The system may also provide advice for traditional games such as chess or backgammon, as well as for wagering events such as horse racing.

The user may elect to receive advice from the game and wagering assistant system for a particular game or wagering event, and the user may enter information regarding the state of the game or event. For example, the user may enter the card values that have been dealt or played during the course of a card game. Inputting card values may be performed by using a keyboard, touch screen, microphone, or any other suitable input system. In a wagering event such as horse racing, for example, a user may receive information from a server to a user's game and wagering assistant on horses, tracks, track conditions, odds, or any other suitable information for upcoming or past races. Alternatively, a user may input such information with a keyboard, touch screen, microphone, or any other suitable input system.

Casino games, traditional games, or wagering events implemented on computers, electronic game devices or systems, or on-line game systems may communicate with a user's game and wagering assistant system to automatically update and track game play and wagering. The user may query the game and wagering assistant system for game play advice such as which card to play, whether to take another card, or any other suitable advice. For example, the game and wagering assistant system may vibrate, give an audible indicator (e.g., beep, synthesized voice instruction, etc.), or display a command on a screen to take a card in a blackjack game. The game and wagering assistant may also provide updated game play or wagering advice based on the updated information.

In some embodiments, the game and wagering assistant system may provide probability information, statistics, or mathematical progression wagering analysis for a particular game or wagering event. For example, this information may be used to determine game play and wagers during the course of a series of rounds of a particular casino game in order to minimize the casino advantage, minimize player losses, or maximize "comps" (complimentary goods or services given by the casino to a player). The user may access this information on a screen of the game and wagering assistant system. Alternatively, the information may be provided to the user in an audible format (e.g., synthesized voice instructions to a user from a speaker, a set of headphones, or an earphone). Any other suitable system or device may be used to access the information and/or communicate the information to the user.

In some embodiments, probability information, statistics, and mathematical progression wagering information may be used to control the rate at which a player loses money (i.e., a "burn rate"). For example, a user may allocate a particular amount of money for wagering on casino games (e.g., allocate $500 to spend on casino game play). The probability and mathematical progression information may be used to control the rate at which money is lost.

The game and wagering assistant system may be adapted for providing information for electronic game devices or systems, games implemented on computers, on-line games or wagering events, or for providing information during table games or at wagering events. In some embodiments of the invention, an assistant may provide information in a separate window from the on-line or computer game or wagering event on the user's computing device.

BRIEF DESCRIPTION OF THE DRAWINGS

Further features of the invention, its nature and various advantages will be come more apparent from the following detailed description of the preferred embodiments, taken in conjunction with the accompanying drawings, in which like reference characters refer to like parts throughout, and in which.

DETAILED DESCRIPTION OF THE INVENTION

The present invention is now described in more detail in conjunction with FIGS. 1-14.

Figure 1:
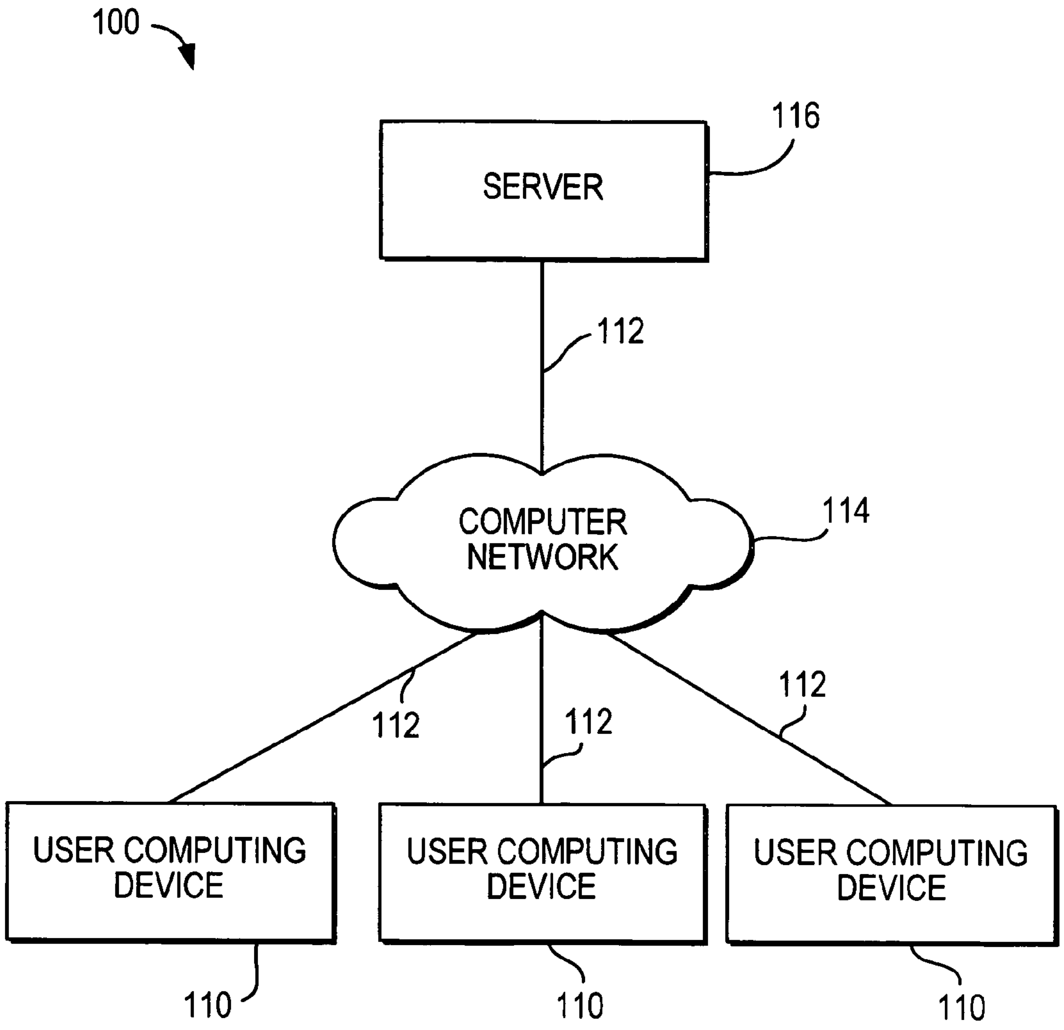
FIG. 1 is an illustrative computer network gaming and wagering system capable of providing game play assistance and wagering advice in accordance with various embodiments of the present invention.

FIG. 1 represents an illustrative game and wagering system in accordance with various embodiments of the present invention. As shown, system 100 may include one or more user computing devices 110 that may be connected by one or more communication links 112 and a computer network 114 to a server 116.

In system 100, user computing device 110 may be a computer, processor, personal computer, laptop computer, handheld computer, personal digital assistant, computer terminal, a combination of such devices, or any other suitable device. User computing device 110 may have any suitable device capable of receiving user input. For example, user computing device 110 may have a keyboard, buttons, a touch screen, or may be voice activated. User computing device 110 may be voice activated by having a microphone to receive input from a user or game administrator, and may be adapted with voice recognition software or hardware which may enable user computing device 110 to perform tasks based on voice input. User computing device 110 may also have a communications interface to send or receive data from computer network 114 over communication link 112.

User computing device 110 may be hardware, software or any suitable combination thereof which may provide game play tracking, as well as game and wagering advice to a user. In some embodiments, user computing device may run game and wagering assistant software. Game and wagering assistant system functions may also be partitioned between user computing device 110 and server 116, and partitioned functions may communicate information with one another as needed. User computing device may have a screen to display game information and playing advice to the user. Alternatively, user computing device 110 may have a speaker, or may be connected to a set of headphones or an earphone to provide audible advice (e.g., synthesized speech) on game play or wagering to a user.

As shown in system 100 of FIG. 1, user computing device 110 may be used to play electronic or on-line games, or participate in wagering events, on computer network 114. In some embodiments, user computing device 110 may be used separately from computer network 114 or server 116 and may provide advice for playing games or participating in wagering events. For example, user computing device 110 may be used to provide advice when a user is at a gambling table in a casino. In some other embodiments, user computing device 110 may provide information for wagering on a horse race.

Communications links 112 may optical links, wire links, wireless links, coaxial cable links, telephone line links, satellite links, lightwave links, microwave links, electromagnetic radiation links, or any other suitable communication links for communicating data between user computing device 110 and server 116.

Computer network 114 may be the Internet, an intranet, a local area network (LAN), a wide area network (WAN), a metropolitan area network (MAN), a virtual private network (VPN), a wireless network, an optical network, a cable network, a digital subscriber line network (DSL), or any other suitable network.

Server 116 may be a processor, a computer, a data processing device, or any other suitable device. In some embodiments, server 116 may be hardware, software, or any suitable combination thereof which may communicate with user computing device 110 to provide games or wagering events, provide information related to the games or wagering events, process gaming or wagering data, provide game rules or strategies, perform statistical analysis on game play or wagering, store game play statistics, or perform any other suitable function.

In some embodiments, electronic game play, wagering events, or related information processing may occur via computer network 114, server 116, user computing devices 110, and communications links 112. Players at user computing devices 110 may conduct electronic gaming or wagering, or obtain game play or wagering advice using suitable input devices connected to or part of user computing device 110. In some embodiments, games or wagering events running on server 116 may provide game update information via computer network 114 and communications links 112 to user computing devices 110. For example, information on cards played during a blackjack game running on server 116 may be sent to user computing devices 110 and automatically tracked and counted by the game and wagering assistant running on the user computing device 110. In another example, horse race information (e.g., horses, odds, past race statistics, etc.) may be provided by server 116 to user computing device 110.

Figure 2:
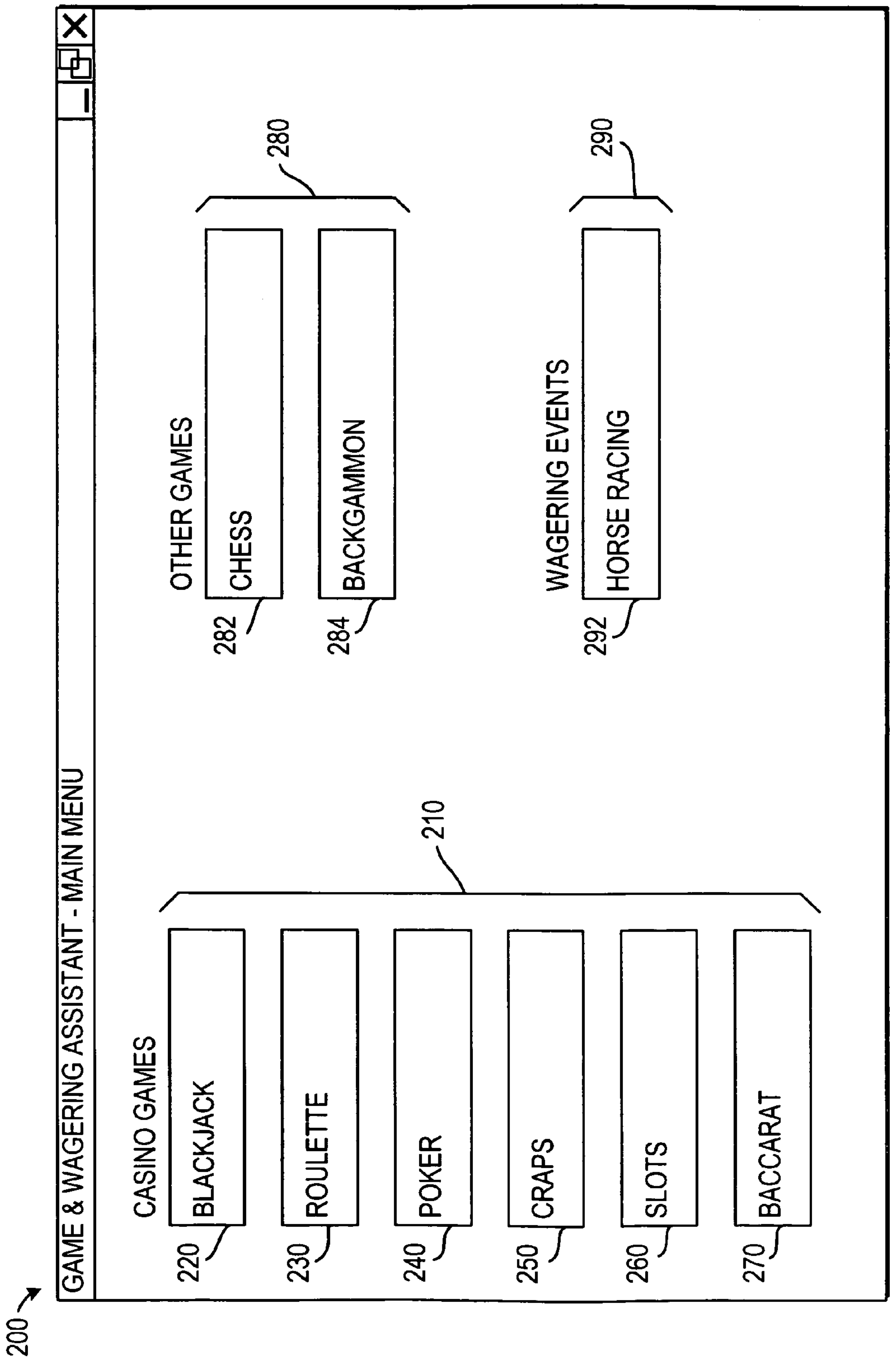
FIG. 2 is an illustrative menu display for game and wagering assistant system in accordance with various embodiments of the present invention.

FIG. 2 illustrates main menu display 200 for a game and wagering assistant system. As shown, display menu 200 may include selectable casino games buttons area 210. Area 210 may include: blackjack button 220, roulette button 230, poker button 240, craps button 250, slots button 260, baccarat button 270, or any other suitable game button. Alternatively, in a voice-activated system with a microphone, a user may select blackjack, craps, slots, baccarat, or any other suitable game with a voice command.

Selection by a user of any of the buttons in area 210 may present a display corresponding to the selected game. For example, if blackjack button 220 is selected, display 300 of FIG. 3 may be presented. Similarly, selecting roulette button 230 may present display 600 (FIG. 6), selecting poker button 240 may present display 800 (FIG. 8), selecting craps button 250 may present display 900 (FIG. 9), selecting slots button 260 may present display 1000 (FIG. 10), and selecting baccarat button 270 may present display 1100 of FIG. 11.

Display menu 200 may also include selectable other games area 280 and wagering events area 290. Other games area 280 may include selectable chess button 282, backgammon button 284, or any other suitable button. Wagering events area 290 may include horse racing button 292 or any other suitable button related to wagering events.

Similar to the selection of buttons in area 210 discussed above, selection of buttons in other games area 280 and wagering events area 290 may present a display corresponding to the selected game or event. For example, if chess button 282 is selected, display 1200 of FIG. 12 may be presented. Similarly, selecting backgammon button 284 may present display 1300 of FIG. 13, and selecting horse racing button 292 may present display 1400 of FIG. 14.

Alternatively, if the game and wagering assistant is adapted to receive and process voice commands, a user may utilize a voice command to select casino games, other game, or event wagering features for a particular game or wagering event. The game and wagering assistant may use synthesized speech projected though a speaker, a set of headphones, or an earphone to provide choices, advice, or game play information to a user. For example, a user may say "blackjack" into a microphone or other suitable device connected to the game and wagering assistant in order to receive blackjack game assistance, or begin logging information related to blackjack game play and wagering.

Figure 3:
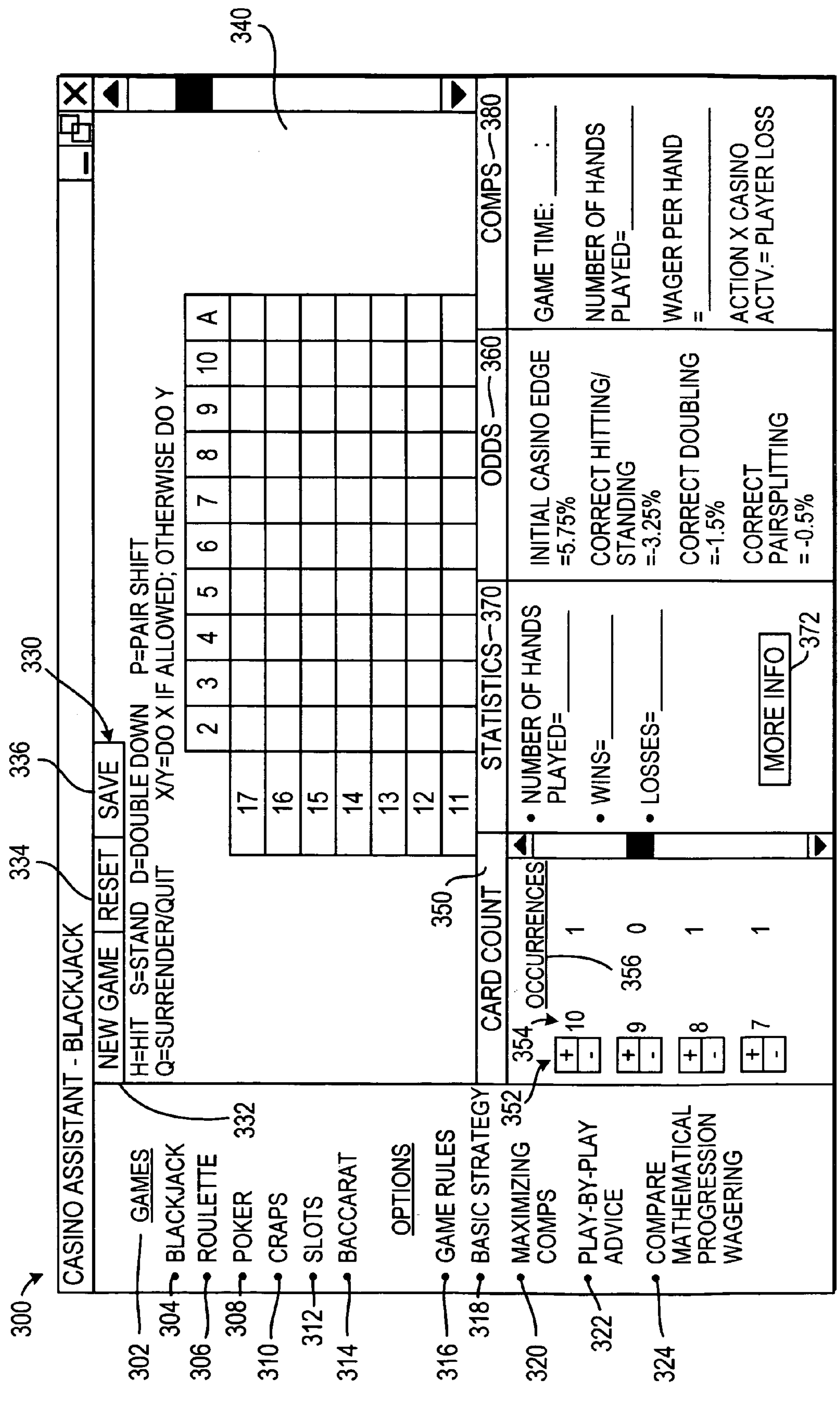
FIG. 3 is an illustrative interactive blackjack display for a game and wagering assistant system in accordance with various embodiments of the present invention.

Turning to FIG. 3, interactive blackjack display 300 of a game and wagering assistant system may provide a user with game assistance and information related to blackjack. In addition to the selectable buttons or features of display 300 described below, voice commands may be used to select features of the game and wagering assistant for blackjack.

Display 300 may include menu bar 302. In some embodiments, menu bar 302 may be divided into games, options, or any other suitable categories. Menu bar 302 may include selectable game menu items such as blackjack button 304, roulette button 306, poker button 308, craps button 310, slots button 312, baccarat button 314 or any other suitable buttons to access advice or assistance for suitable casino games. Similar to buttons 220-270, 282-284, and 292 of display 200 discussed above, buttons 304-314 may be selected to change the display to show advice, statistics, game play information or other suitable information for other casino games.

Menu bar 302 may also have options buttons, which may include game rules button 316, basic strategy button 318, maximizing "comps" button 320, play-by-play advice button 322, compare mathematical wagering progressions 324, or any other suitable button. Selection of buttons 316-324 may present displays with information which relate to interactive blackjack display 300.

A user may, for example, select game rules button 316 in order to view basic rules of blackjack in a separate window or display. Similarly, selection of basic strategy button 318 may provide a user with a display of strategy options for blackjack. Selection of maximizing comps button 320 may provide a user with strategies for obtaining "comps" (i.e., complimentary goods or services from a casino, such as food, hotel accommodations, etc.). Button 322 may be selected by a user to obtain play-by-play advice for a blackjack game.

In some embodiments, selecting button 324 may provide a user with comparisons of different mathematical progressions (e.g., d'Alembert, Fibonacci, etc.) which may be used to optimize wins and losses. For example, display 400 (illustrated in FIG. 4) showing comparisons of wagering using different mathematical progressions may be presented when a user selects button 322. Display 400 may provide wagering and payoff scenarios using a variety of mathematical progression models. Mathematical progression information may be used in order to minimize losses over a particular wagering round of a game or wagering event, a particular game or wagering event, a series of rounds of a game or wagering event, or over many kinds of games or wagering events. In some embodiments, mathematical progression information may also be used to aid a user in controlling the rate at which money is expended on wagering during game play of a particular game or for a series of games. Such mathematical progression wagering advice and analysis may indicate odds and potential gains for such strategies as doubling a wager after a win, or reducing a wager after a loss, or other wagering strategies.

Mathematical progressions for wagering may be used to formulate wagers. Using the D'Alembert system for wagering in games, for example, one increases a wager by one unit after a loss, and decrease the wager by one unit after a win. A unit may be $1, $5, $20, or any other suitable monetary value. For example, a player wagers one unit in a game and subsequently loses. The player is at −1 units. Following the D'Alembert progression by increasing the number of units after a loss, the player would increase the wager by 2 units for the following round or game played. If the player wins, the player is now +1 units. Again, following the D'Alembert progression by reducing the number of units after a win, the player would bet 1 unit. If the player then loses, the player is at +0 units. If the player uses the D'Alembert progression again, wagers two units, and subsequently loses, the player is now at −2 units. Using D'Alembert again that indicates to increase the number of units after a loss, the player increases the wager to 3 units. Play, will continue to occur until a stop-win or a stop-loss point, or any other suitable point determined by the player.

There is no specific determined stop-win point with the D'Alembert system of play, other than one which is predefined by the user. In some embodiments, a user may indicate (e.g., using a verbal command into a microphone, using a touch screen, using a keyboard, etc.) a stop-win amount in the game and wagering assistant device. For example, if one unit of profit is indicated as the stop-win amount, then the player would have reached the stop-win point after the first round (+1 unit) in the example above). Upon reaching a stop-win point, a user may quit a game or begin a new sequence. Under D'Alembert, the higher the stop-win number, the longer the sequence may be. A series of losses in sequence using D'Alembert may cause a player to lose money quickly. In some embodiments, a user may indicate a stop-loss point for a sequence of play to help control losses or control the rate at which money is lost (i.e., control the "burn rate" of a predetermined amount of money for wagering purposes).

Figure 4:
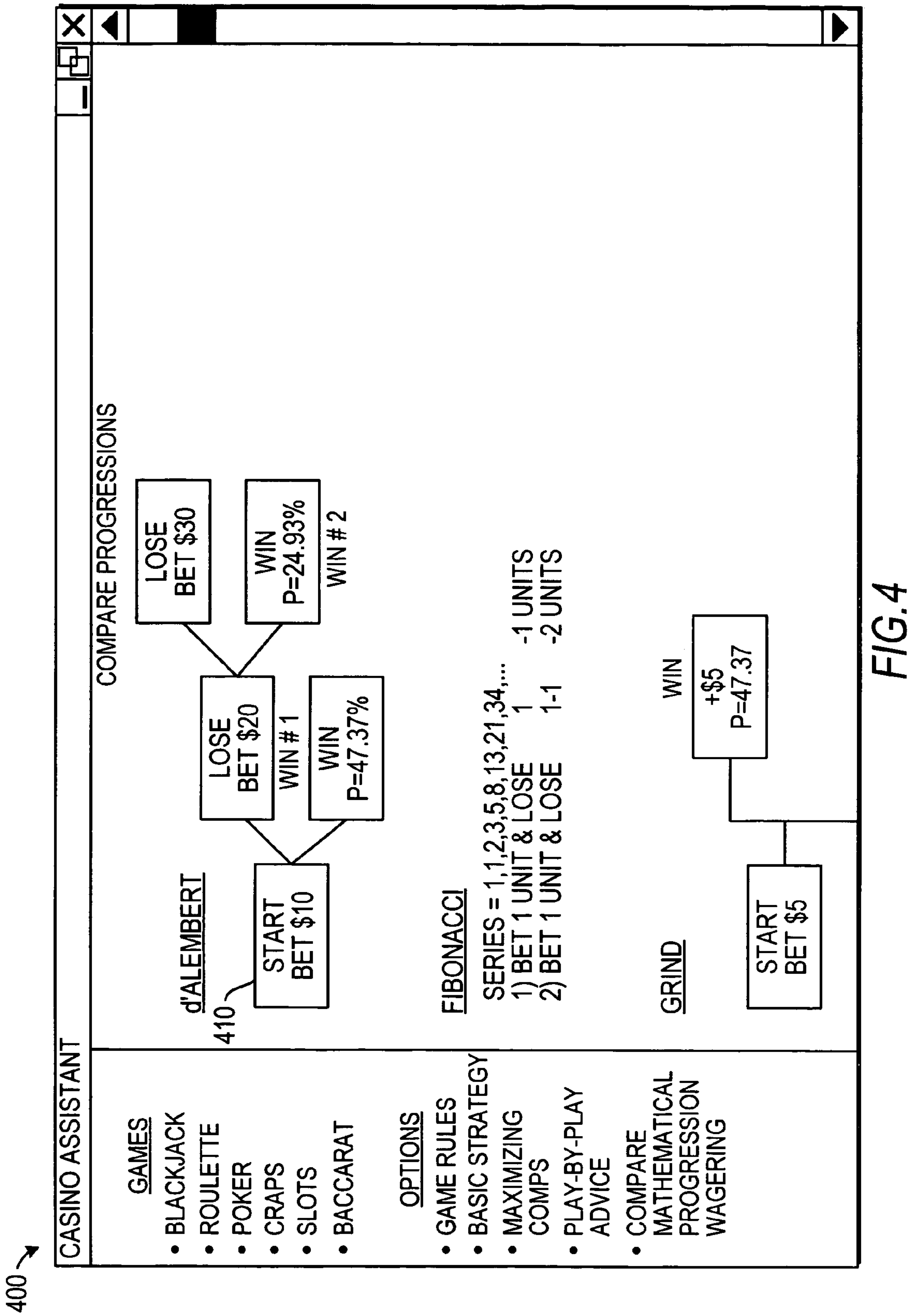
FIG. 4 is an illustrative mathematical progression comparison display for a game and wagering assistant system in accordance with various embodiments of the present invention.
Figure 5:
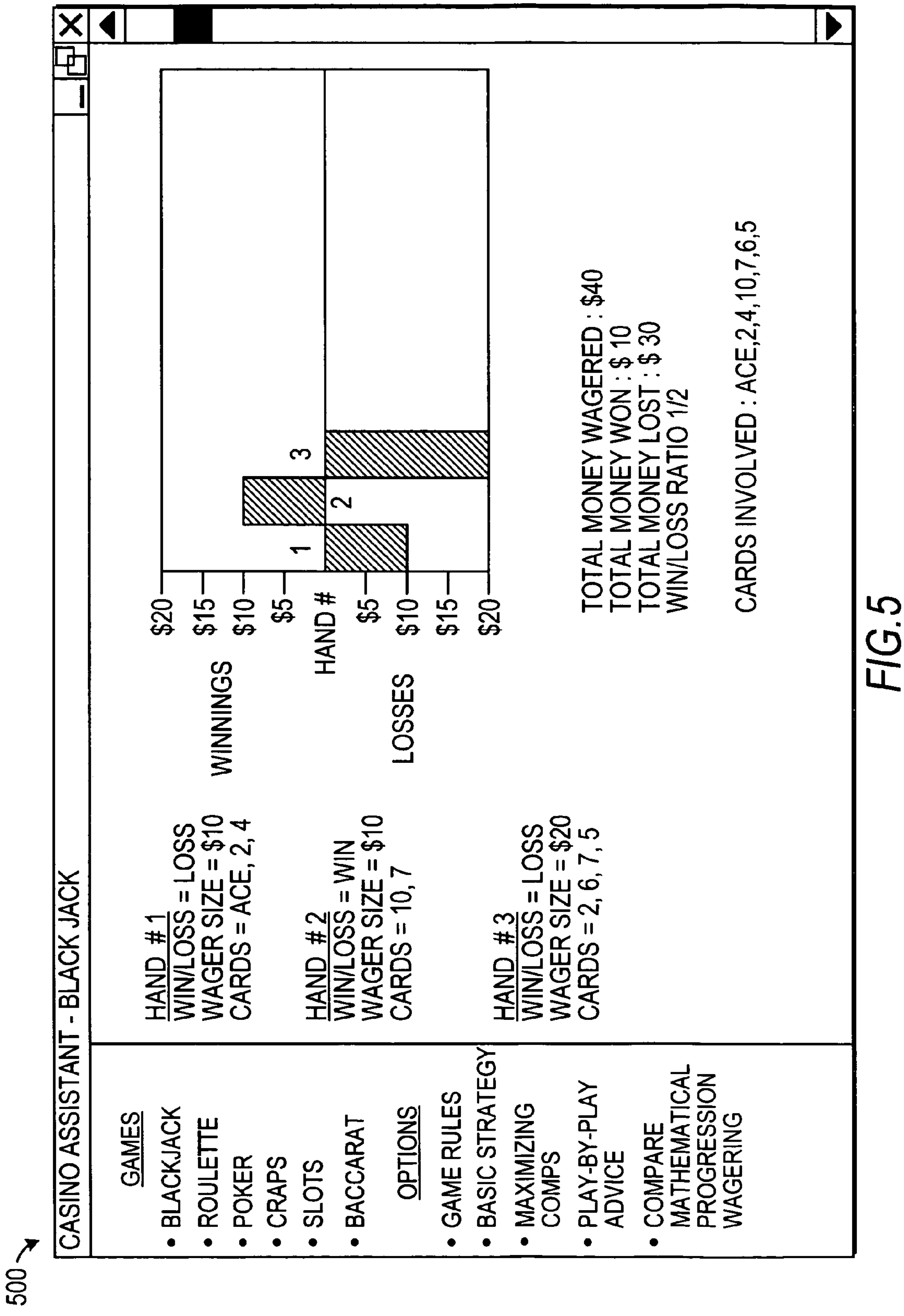
FIG. 5 is an illustrative statistical summary display for a game and wagering assistant system in accordance with various embodiments of the present invention.

FIG. 4 illustrates display screen 400 which contains diagrams indicating the probabilities of events under various progressions. For example, the D'Alembert progression diagram 410 of display screen 400 illustrates probability information for a roulette wheel (double zero version with 38 pockets). Players may bet on numbers 1-36, where half the numbers are red, and the other half are black. For example, if one wagers on red or black, there are 18 ways (one-half of 36, since half are red and half are black) out of 38 ways (numbers 1-36, plus zero and double zero) to win the wager. Therefore, 18 ways divided by 38 total ways equals 0.4737, or 47.37%. There are 20 ways out of 38 to lose the first wager. The chances of losing the first wager ($20/38$) times winning the second wager ($18/38$) are 24.93%.

In some embodiments, the game and wagering assistant system may calculate the probability of winning a particular series of wagers. Continuing with the example above involving roulette, the probability of a win is $18/38$ and the probability of losing a wager is $20/38$ for each spin. If a player loses the first three wagers, and wins the next two wagers, the probability of winning the next wager would be $(20/38)^3 \times (18/38)^2$, which would equal 3.27% (probability of total sequence occurring).

Turning again to FIG. 3, display 300 may have toolbar 330, which may include new game button 332, reset button 334, save button 336, or any other suitable buttons. A user may select button 332 in order to initialize display 300 for a new blackjack game but retain summary information of previous games. However, if a user selects button 334, all of the information presented on display 300 may be reset. If a user would like to save the game play data for a game or a series of blackjack games, the user may select button 336. The game play data may be saved, for example, on user computing device 110 or server 116 (both illustrated in system 100 of FIG. 1).

Window 340 of display 300 may present blackjack strategy for a user. Alternatively, the game and wagering assistant may provide audible advice (e.g., synthesized voice) over a speaker, headphones, or earphone to a user. Table 342 of window 340 may include playing advice for different card combinations. For example, table 342 may advise to hit, stand, double down, pair split, surrender (quit), do X if allowed or otherwise do Y, or any other suitable advice. In some embodiments, individual items of advice in table 342 may be selected in order to obtain additional information regarding the advice (e.g., definition of term, rationale for advice, etc.). In some embodiments, if table 342 is too large to fit in window 340, or additional tables of advice are presented (e.g., a table with advice for pair splitting, etc.), the user may be able to scroll down to see the rest of table 342 or additional tables of advice.

Window 350 may assist a user with card counting in blackjack game play and wagering. In some embodiments, window 350 may be integrated with display 300, or may be a separate window or may be presented on a separate display. Add/subtract button 352 may allow a user to increase or decrease the occurrence of a card. In some embodiments, button 352 may be placed adjacent to a card reference 354 (e.g., 2, 3, 4, 5, 6, 7, 8, 9, Ace, etc.). Number of occurrences 356 may be adjacent to each card reference 354 to indicate the number of times a card has appeared. Alternatively, with a voice-activated game and wagering assistant system, a user may indicate which cards have been played by speaking into a microphone, or alternatively by using a directional microphone to pick up the dealer's recitation of the played cards. Voice recognition software or hardware may interpret the speech received by the microphone, and keep track of the cards played. If the game and wagering assistant determines that a user should take another card, the game and wagering assistant may vibrate, produce an audible noise (e.g., beep, etc.) or command (e.g., synthesized voice command), indicate the information on a display screen, or inform the user in any other suitable manner.

Window 360 may present odds, probability, or statistical information to the user for blackjack. For example, information such as initial casino edge percentage (e.g., a casino may have a 5.75% advantage for blackjack), correct hitting/standing percentage, correct doubling percentage, correct pair splitting percentage, or any other suitable information, may be presented.

Similarly, window 370 may summarize game play information, including number of hands played, wins, losses, or other suitable information. Additional information button 372 may be selected by a user in order to view summary information for each game. For example, if additional information button 372 is selected, display 500 of FIG. 5 may be presented to show wins, losses, wagers, cards, graphs of winnings or losses for each hand, a chart of cards played, or any other suitable information for each blackjack hand played.

Window 370 of FIG. 3 may also indicate the rate at which a user is losing money on wagers. For example, a user may monitor how quickly they are approaching a predetermined amount of money allocated for wagering on games or events (i.e., a user may monitor their "burn rate" on wagers).

Interactive blackjack display 300 of FIG. 3 may include "comps" window 380, which may assist a user in optimizing the complimentary goods or services received from a casino. Typically, casinos may determine how much a player's "action" is worth. Action may be the amount of money risked over a period of time (e.g., 100 hands×$10 per hand×3 hours=$3000). Casinos may calculate the amount of a player's action they expect to win by multiplying the level of action for a player by the casino advantage for a game. This calculation may also be used by the player to determine the amount of losses a player may sustain.

Casinos may give players comps worth a certain percentage of the player's losses (e.g., 20%). A blackjack player may use the information presented in window 380 in order to get more in comps (than correspond to the losses sustained by the player at blackjack or correspond to the typical sustained). A casino may earmark a certain loss for a player, and may give a comp to the player which is worth a certain percentage of that loss. By using the game play strategy information in display 300, the player may minimize their losses, reduce the casino's advantage, and maximize comps.

In some embodiments, window 380 may provide information which may allow a user to perform valuation of comps offered by a casino. A user may select a particular comp to compare actual losses, or estimated, to comps. Alternatively, window 380 may present valuation analysis for a series of comps offered. Thus, a user may determine to what extent a comp may make up for losses sustained.

Comp valuation information may allow a user to make an informed decision if a user is presented with a choice of comps. Also, if comps are offered to entice a player to come to a casino to play blackjack or other casino games, a user may be able to determine to what extent potential losses may be offset by comps from a casino.

Figure 6:
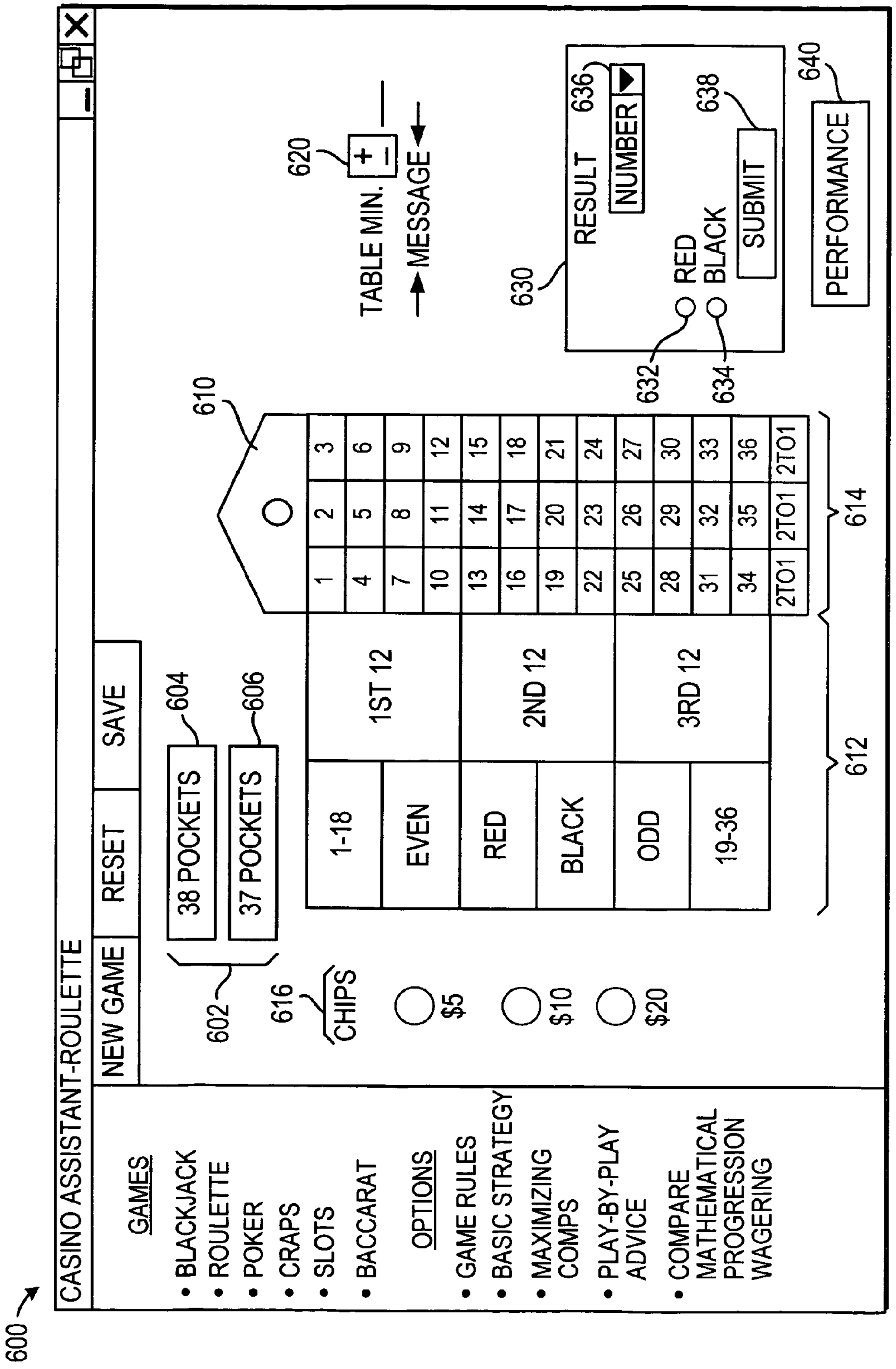
FIG. 6 is an illustrative interactive roulette display for a game and wagering assistant system in accordance with various embodiments of the present invention.
Figure 7:
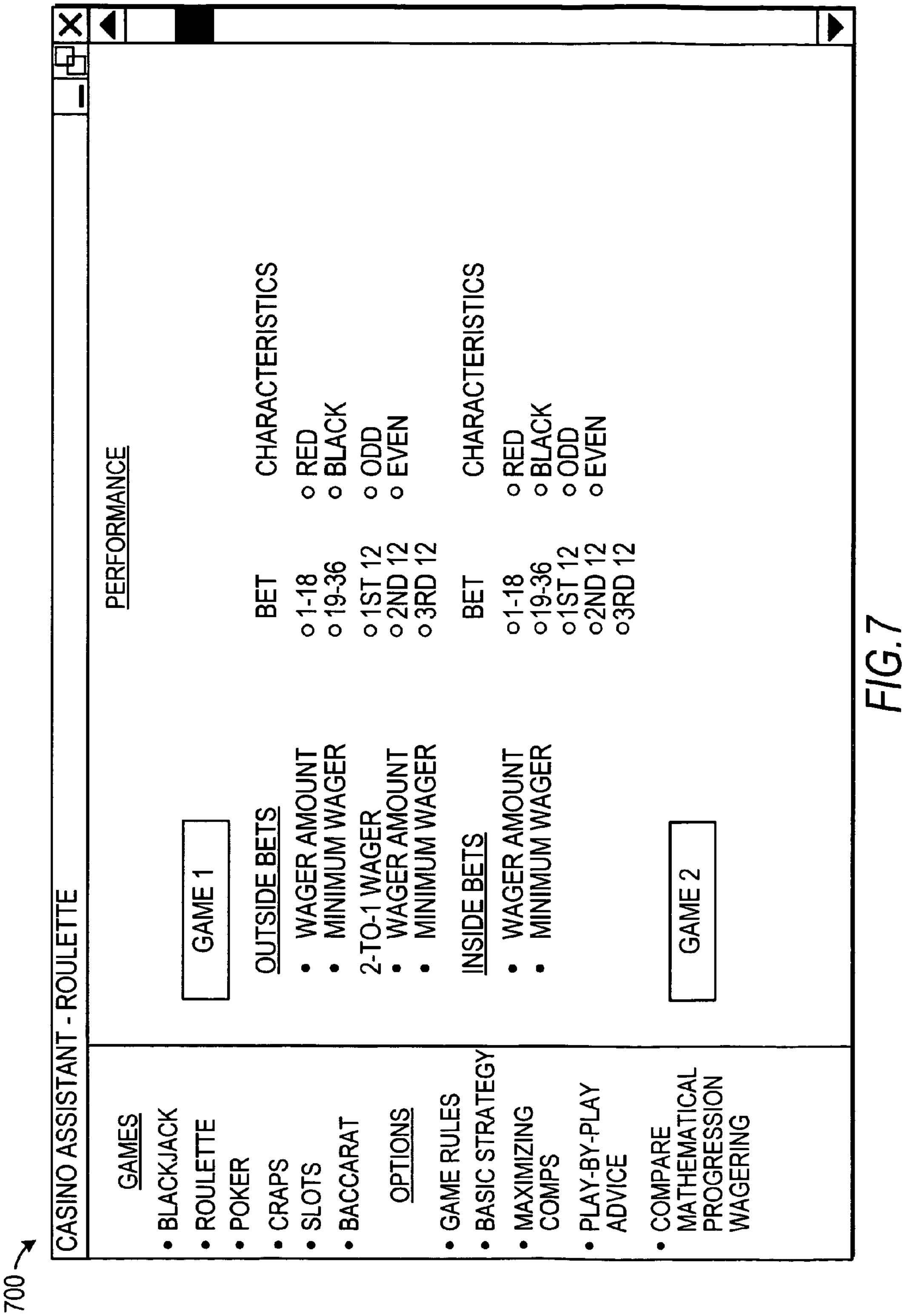
FIG. 7 is an illustrative roulette performance statistics display for a game and wagering assistant system in accordance with various embodiments of the present invention.

Turning to FIG. 6, interactive roulette display 600 may provide information and game play advice relating to roulette play. Display 600 may have a side menu and toolbar with a similar appearance and functionality to menu bar 302 and toolbar 330 in system 300 (FIG. 3). However, selectable options in the menu bar, such as game rules, basic strategy, maximizing comps, play-by-play advice, or compare mathematical wagering progressions may present displays of information related to roulette.

Game selector area 602 may allow a user to select the number of pockets for the roulette game. Option 604 may allow a user to select a game with 38 pockets (includes zero (0) and double zero (00)), while selecting option 606 may allow a user to view information for a 37 pocket game (French style). In some embodiments, selection of option 604 or option 606 may alter roulette betting area 610. Alternatively, a user may provide voice commands to the game and wagering assistant regarding the number of pockets for the roulette game using a microphone, and the game and wagering assistant may process these commands. The game and wagering assistant may provide advice on wagering (i.e., what amount of money) and which numbers or color to wager on in roulette. This information may be provided on a screen of the game and wagering assistant, or may be provided by synthesized voice played on a speaker, a set of headphones, or an earphone.

Betting area 610 may include outside betting area 612 and inside betting area 614. Outside betting area 612 may allow for betting on red, black, odd, even, numbers 1-18, numbers 19-36, the first 12 numbers, the second 12 numbers, the third 12 numbers, or any suitable combination thereof. Inside area 614 may include numbers 1-36, 2-to-1 areas, or any other suitable areas.

Chip area 616 may allow a user to select a betting chip (e.g., \$1, \$5, \$10, \$20, etc.) and drag it to betting area 610 to represent a wager. Alternatively, wagers may be placed in betting area 610 by voice commands by the user into a microphone of the game and wagering assistant device or with any other suitable method. In some embodiments, a user may change the value of the chips or add new chips with new values.

Table minimum button 620 may allow a user to increase or decrease the table minimum according to the rules of the game. In some embodiments, display 600 may present information to the user whether their wagering is correct based on the table minimum and game rules (e.g., rules for placing wagers in outside betting area 612 or inside betting area 614). For example, inside bets typically need to add up to the table minimum, while outside bets have to each meet the table minimum. A message may be presented on screen 600 or may be given in an audible message (e.g., synthesized voice from a speaker, earphone, or headphones connected to or part of the game and wagering assistant) by the game and wagering assistant if inside or outside wagers are incorrectly made based on the table minimum set by the user or the game rules.

Enter results area 630 may allow a user to input data based on the results from casino table play, electronic roulette game play, on-line roulette play, or any other suitable game play. A user may use red option 632 or black option 634 to indicate color, and may use pull down menu 636 to indicate the number (e.g., numbers 1-36, etc.). Alternatively, with a game and wagering assistant equipped with a microphone and voice recognition capabilities, a user may give a voice command to select red or black options, or a number from 1-36. In some embodiments, the user may select submit button 638 in order to store the wagering information and the user's result based on the outcome and the wager made.

Statistical information regarding the user's wagering and win/loss record may be viewed by selecting performance button 640. For example, selecting button 640 may present performance statistics display 700, illustrated in FIG. 7. In some embodiments, information regarding the rate at which a user is losing money may be indicated such that the user knows how quickly, for example, he or she is losing the total amount of money that they have allocated for wagers on a casino game or series of games. Thus, a user may set a total amount of money that they are prepared to spend on wagers, and this feature As shown, display 700 of FIG. 7 may have information for each roulette game played, including wager amounts and minimum wager information for outside bets, 2-to-1 wagers, inside bets, or any other suitable information. Display 700 may also present the characteristics of the wager made for each game (e.g., red, black, even, odd, 1-18, 19-36, first 12 numbers, second 12 numbers, third twelve numbers, amount won/lost, etc.). In some embodiments, display 700 may indicate whether the user was utilizing a mathematical progression for wagering for a particular game (e.g., Fibonacci, d'Alembert, etc.). There may be an advantage of using mathematical progression for wagering in order to optimize wagering for particular game play decisions to minimize monetary losses, or control the rate at which money is lost. Furthermore, game play advice wagering analysis may be particularly helpful if a casino or other game provider alters the odds of winning. For example, a casino or other game provider may announce that number 11, 17 and 33 will pay 40-1 odds instead of the standard 35-1. The game and wagering assistant may advise a user on game play and wagering with these revised odds.

Figure 8:
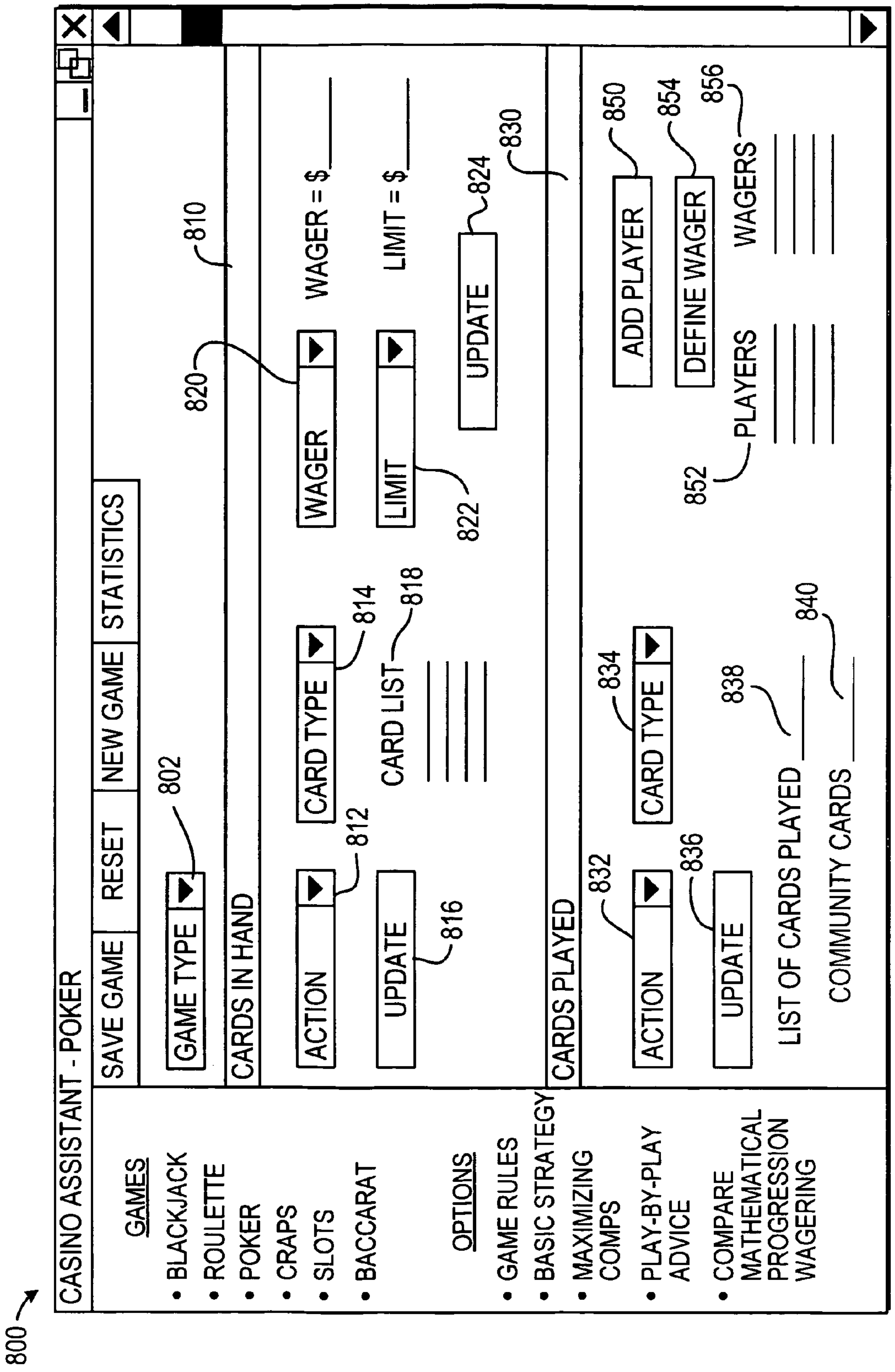
FIG. 8 is an illustrative interactive poker display for a game and wagering assistant system in accordance with various embodiments of the present invention.

Turning to FIG. 8, interactive poker display 800 may be viewed when a user selects poker button 240 from main menu 200 or when the user selects poker game option from the menu bar in the displays illustrated in FIGS. 3-10. Alternatively, a user may use a voice command into a microphone connected to the game and wagering assistant to invoke the poker game option.

Display 800 may have a menu bar similar to menu bar 302 and a toolbar 802 similar to toolbar 330 of display 300 (FIG. 3). In some embodiments, the toolbar may include a button to activate displays for poker game statistics (e.g., number of wins, wagers made for each play, amount of wagers made by other players, amount of money or comps won, etc.).

Game type menu 802 may be selected by a user to select the version of poker, particular play options, or any other suitable options. Menu 802 may include Hold 'em, Omaha, or Stud poker game options, as well as a high/low option or any other suitable option. In some embodiments, the selection of the game type may affect the advice given if the user selects the play-by-play advice option in the menu bar.

Window 810 may contain information related to the user's cards for a poker game. Action menu 812 may be a menu that may allow a user to select from options to add a card, remove a card, play a card, or any other suitable option. Upon selecting an action, the user may next select a card from card type menu 814 which may include a list of cards (e.g., 2-10, Jack, Queen, King, Ace, etc.). If the user selects update button 816, user card list 818 may be updated to show the current cards of the user's poker hand. Alternatively, a game and wagering assistant system with a microphone and with speech recognition capabilities may receive and process voice commands from a user or other person related to adding a card, removing a card, playing a card, the type of card, or perform any other function related to updating game play information. In some embodiments, the card information for the user and other players may be automatically updated as game play occurs where the poker game is a computer game or on-line game. Game play information may be communicated between the poker game software or hardware and the game and wagering assistant system. In some embodiments, the game and wagering assistant may provide audible instructions (e.g., synthesized voice commands to the user) as to what cards to play or what amount to wager.

Wager menu 820 may allow a user to select a wager value (e.g., $5, $10, $20, etc.). Limit menu 822 may allow a user to select a table limit for the poker game (e.g., no limit, $20, etc.). If the user selects update button 824, the wager or limit information displayed in window 810 may be updated.

Cards-played window 830 of display 800 may allow a user to track a poker game and input information to allow interactive poker display 800 to provide advice on game play. Action menu 832 may allow a user to select community cards available, cards played, or any other suitable option. Card type menu 834 may allow a user to select the card value (e.g., 2-10, Jack, Queen, King, Ace) after selecting the action involving the action. Alternatively, the card type may be selected before the action from menu 832. Selecting button 836 may update list of cards played 838 or community cards available list 840. Alternatively, a game and wagering assistant system with a microphone and voice recognition capabilities may receive voice commands from a user to indicate community cards available, cards played, card type, or any other suitable information to update game play tracking in the game and wagering assistant. Again, as mentioned above, a game and wagering assistant may provide advice to a user as to what cards to play and wagering amounts with a synthesized voice or on a screen. In some embodiments, cards available and cards played information may be automatically updated between the game and wagering assistant and the electronic, computer, or on-line poker game.

Add player button 850 may allow a user to enter information about other players of the game. Player information may be displayed in area 852. Define wager button 854 may allow a user to define wager information related to the list of players displayed in area 852. Wager information may be displayed in area 865.

Figure 9:
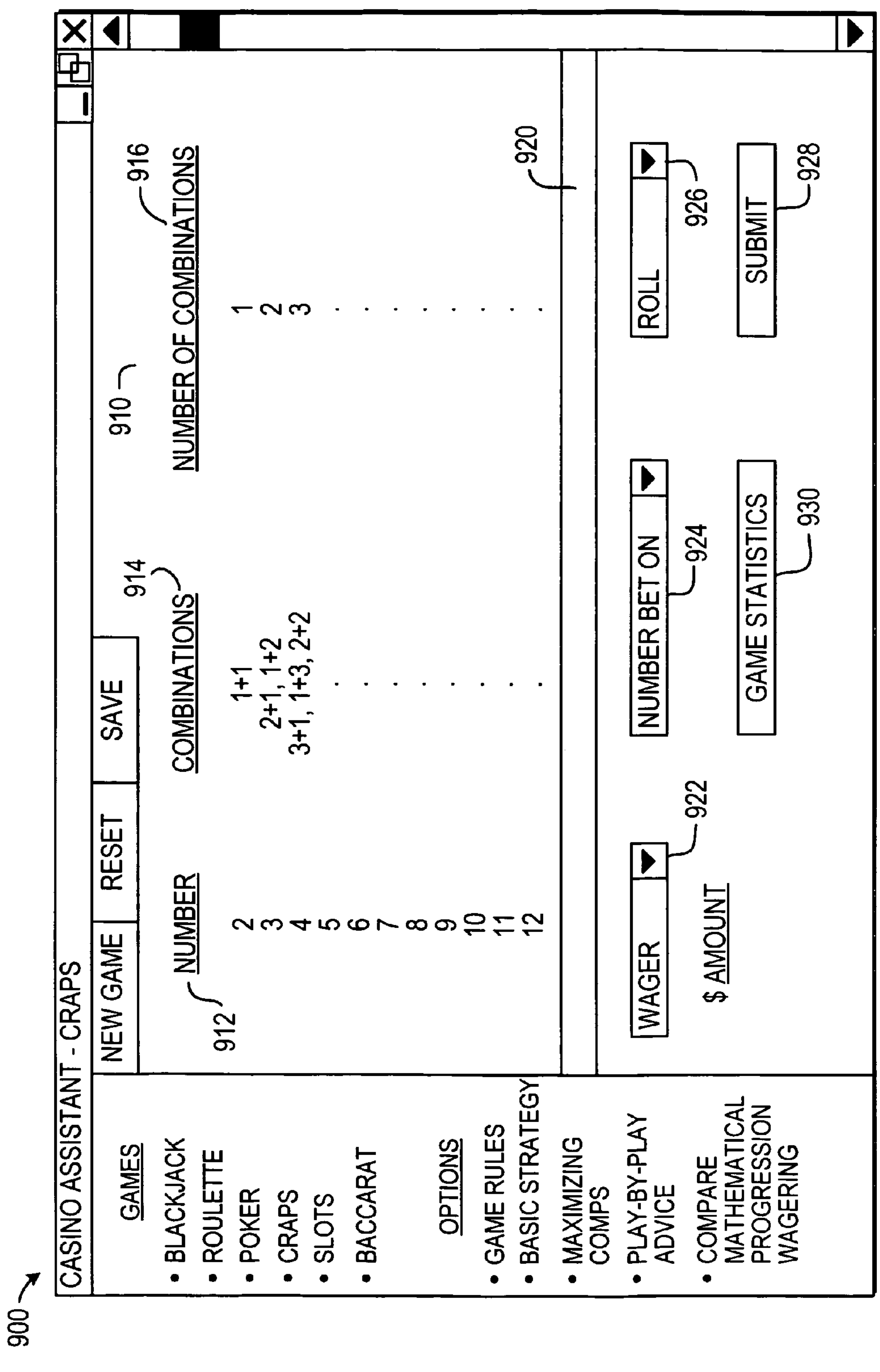
FIG. 9 is an illustrative interactive craps display for a game and wagering assistant system in accordance with various embodiments of the present invention.

Turning to FIG. 9, craps display 900 may provide a user with information to assist them with playing and wagering in craps games. Similar to displays for other casino games discussed above (e.g., blackjack display 300 of FIG. 3, roulette display 600 of FIG. 6, etc.), display 900 may include a menu bar and a toolbar.

Window 910 of display 900 may include number area 912, combinations area 914, number of combinations 916, or any other suitable information. Area 912 may include the number achieved upon a roll of two dice (e.g., 2-12). Area 914 may list the combinations of numbers that may make up a number in area 912. For example, the number 7 may be achieved by combinations of 6+1, 1+6, 5+2, 2+5, 4+3, and 3+4. Area 916 may list the number of combination for a particular number. For example, the number 7 may have 6 different combinations (6+1, 1+6, 5+2, 2+5, 4+3, and 3+4).

Window 920 of display 900 may provide tools to allow a user to enter wagering information. Button 922 may allow a user to enter the amount wagered for a particular roll of the dice. Menu 924 may allow a user to select the number that the user may bet on (e.g., 2, −12, pass line, etc.) with the entered wager amount (e.g., amount entered with button 922). Roll menu 926 may allow the user to enter what the result of the roll was (e.g., 7, 11, craps (2, 3, 12), point (4, 5, 6, 8, 9), etc.). Submit button 928 may allow the wagering information and game play statistics to be stored, for example, in a computing device. Alternatively, entering wager information may be done by voice commands made by a user into a microphone connected to a game and wagering assistant system. In some embodiments, a user may receive audible advice from the game and wagering assistant device on which combinations to wager on and the wagering amount.

The user may view the statistical information related to game play by selecting button 930, giving a voice command into a microphone connected to the game and wagering assistant system, or by any other suitable method. In some embodiments, selection of button 930 may present a separate display screen to the user which may include, for example, number of rolls, results of each roll, the amount wagered, what numbers wagers were placed on, or any other suitable information.

Figure 10:
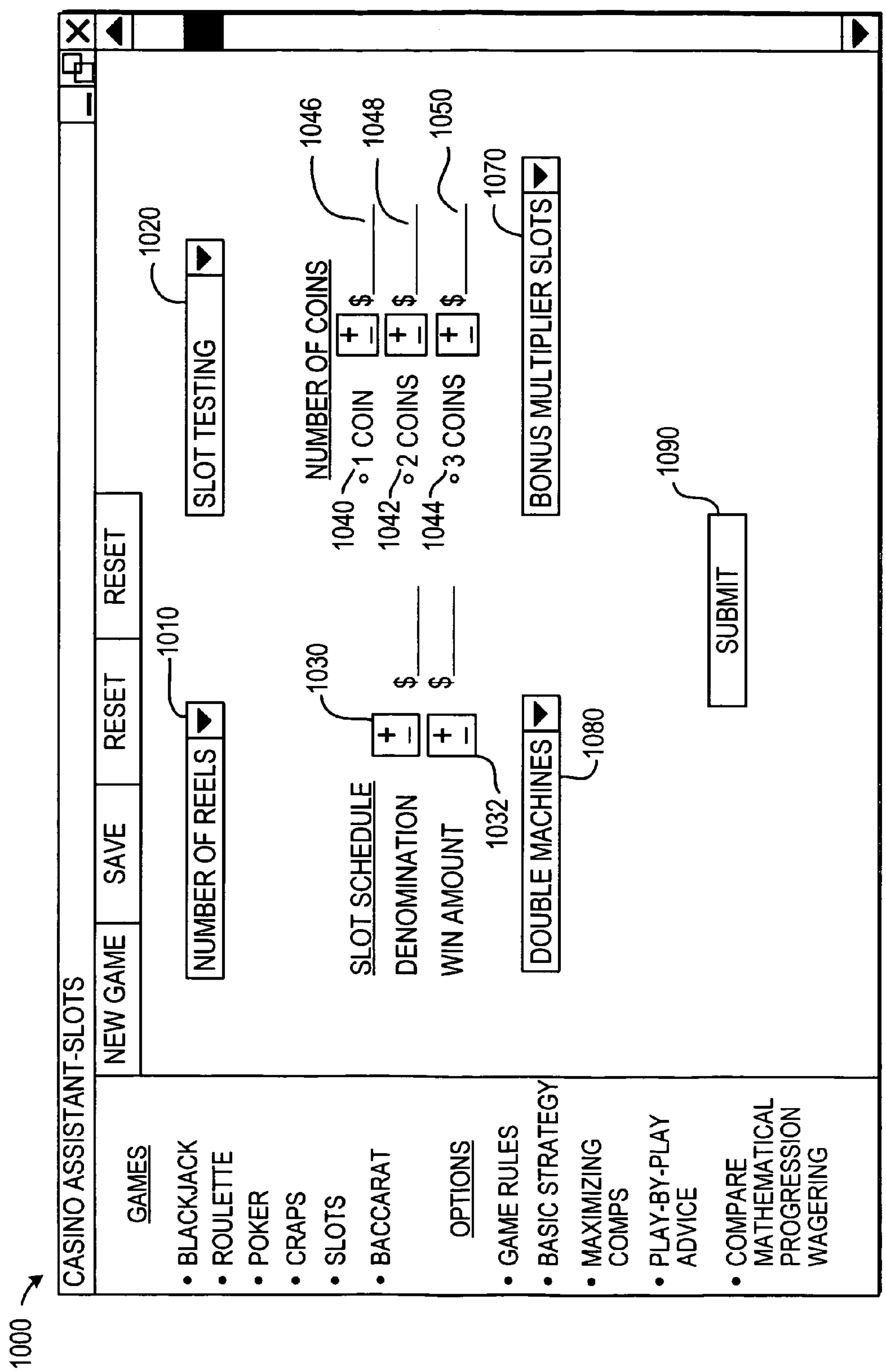
FIG. 10 is an illustrative interactive slots display for a game and wagering assistant system in accordance with various embodiments of the present invention.

Interactive slots display 1000 illustrated in FIG. 10 may assist a user in wagering and game play with various slot machines. The user may select the type of slot machine using number of reels menu 1010. The user may select a three reel, a five reel, or any other suitable number reel slot machine using menu 1010, a voice command into a microphone connected to the game and wagering assistant, or any other suitable method.

In some embodiments, the user may indicate whether they are performing slot testing using menu 1020. When the user selects the slot testing mode, a user may wish to gather information on the payoff rate of a slot (e.g., gather a sample set of information regarding the behavior of a slot machine game). The information obtained during slot testing may be stored by a game and wagering assistant system or server and used to offer advice regarding slot play and wagering.

A user may enter information relating to the slot schedule for a particular machine using denomination button 1030 and win amount button 1032. Buttons 1030 and 1032 may allow a user to enter the posted information regarding denominations and win amount for a slot machine or game. Alternatively, voice commands may be given by the user into a microphone connected to a game and wagering assistant device with voice recognition capabilities for entering information regarding denominations and win amounts.

Buttons 1040, 1042, and 1044 may be used to select one coin, two coin, or three coin slot options, or any other suitable coin number. Buttons 1046, 1048 and 1050 may respectively be used to enter the monetary payout based on the number of coins entered. Alternatively, voice commands may be used to select these features.

The payoff percentage rate may be indicated at area 1060 of display screen 1000. The payoff percentage rate may, for example, be based on information posed on the slot machine, from slot testing, previous pulls of the slots, or any other suitable information. In some embodiments, the user may select graph button 1062 to view a graph of the payoffs for each pull of the slots.

Menu 270 may allow a user to select bonus multiplier factors. Menu 270 may include multi-jackpot, triple double diamond, five times pay, cherries 'R wild, triple red white and blue, or any other suitable menu options. In some embodiments, if one menu item is selected, another menu may be accessed to identify the bonus type (e.g., bonus credit, scatter pay, free spin, etc.). Selection of submit button 1090 may allow the entered slot machine information to be retained by a user computing device (e.g., user computing device 110 illustrated in FIG. 100). In some embodiments, the game and wagering assistant may give audible advice on whether to continue playing a slot machine given the payout sample data, or advice on increasing or decreasing the amount of the wager.

Figure 11:
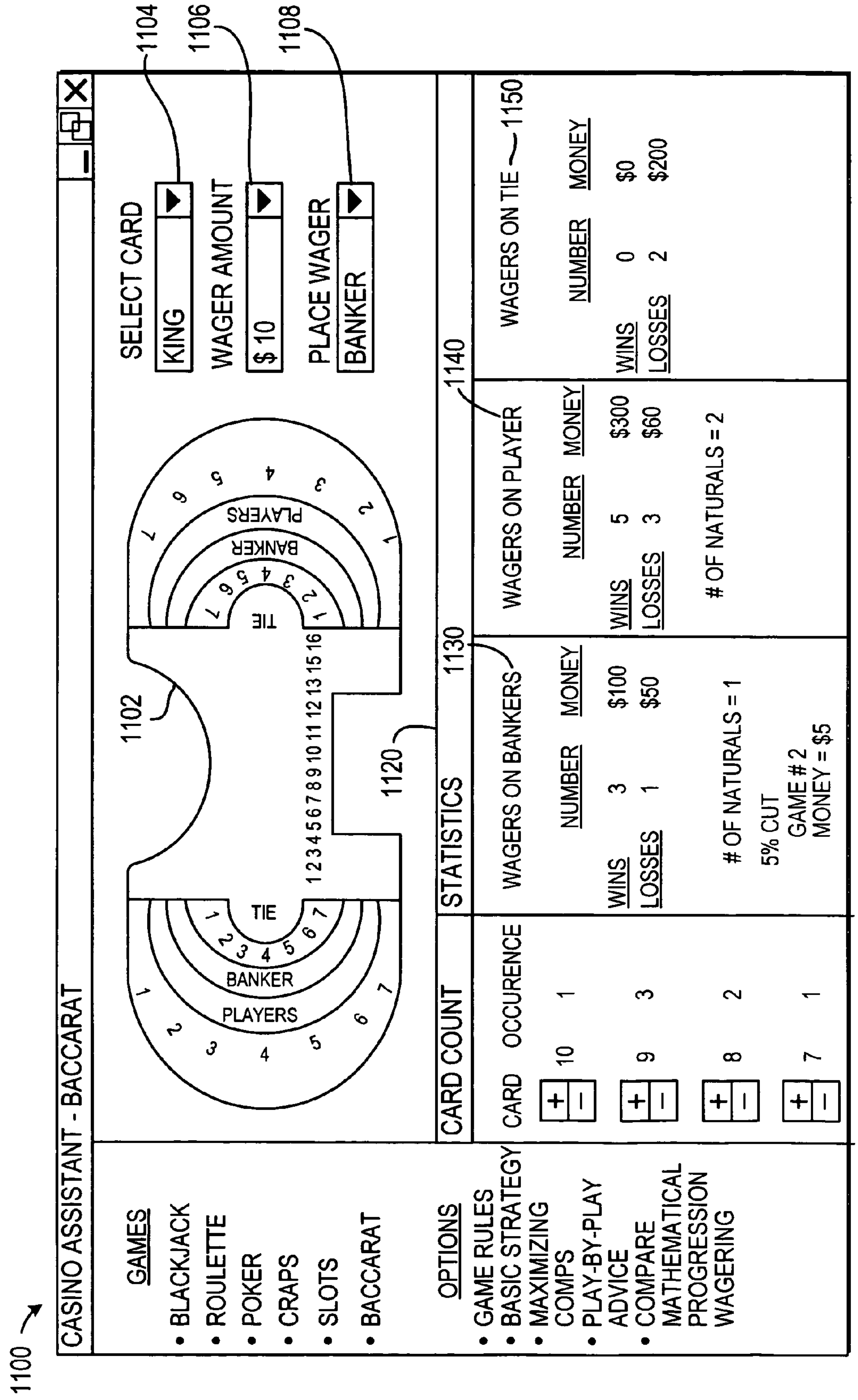
FIG. 11 is an illustrative interactive baccarat display for a game and wagering assistant system in accordance with various embodiments of the present invention.

Turning to FIG. 11, interactive baccarat display 1100 may assist a user in wagering and game play with baccarat. Display 1100 may have a side menu with similar appearance and functionality to menu bar 302 in display 300 illustrated in FIG. 3. However, selectable options in the menu bar such as game rules, basic strategy, maximizing comps, or compare mathematical wagering progressions may present displays of information related to baccarat.

Baccarat table 1102 shown in FIG. 11 may have the same layout as a standard baccarat table. Wagers may be placed for the banker hand winning, the player hand winning, or for a tie. There may be seven numbered positions on each side of baccarat table 1102. The numbers may run from one to fifteen, excluding the number thirteen. Each position may have three betting areas associated with it that correspond to banker, player, and tie.

Alternatively, baccarat table 1102 of display 1100 may be a mini-baccarat table, wherein the table is essentially one end of the standard baccarat table. Just like the standard baccarat table, the mini-baccarat table may have seven areas around the outer edge of the table, each with three spots for betting.

Select card window 1104 allows a user to select cards and place them onto baccarat table 1102 to represent the game being played. Alternatively, a user may enter card information with voice commands into a microphone coupled to the game and wagering assistant system, wherein the system will process the information. Wager amount window 1106 may allow a user to enter a wager amount. Place wager window 1108 may allow a user to select what the user is betting on (e.g., the banker, the player, or a tie).

Card count window 1110 may assist a user with card counting in baccarat game play and wagering. In some embodiments, window 1110 may be integrated with display 1100, or may be a separate window or may be presented on a separate display. Card count window 1110 may be appear and function similarly to window 350 of FIG. 3 for counting cards.

Statistics window 1120 may provide statistical information on wins, losses, wagers, or any other suitable information. Wagers on banker window 1130 may display information related to the number of wins and losses by the user, as well as the amount of money won or lost on wagers or any other suitable information. Wagers on banker window 1120 may also indicate the number of naturals (e.g., if the first two cards total nine or eight, the hand is referred to as a natural). Also, wagers on banker window 1130 may display the amount of money taken by the 5% commission fee (generally, if one places wagers on the banker and wins, a 5% commission fee is assessed). Wagers on player window 1140 and wagers on ties window 1150 may display similar information to wagers on banker window 1130.

Figure 12:
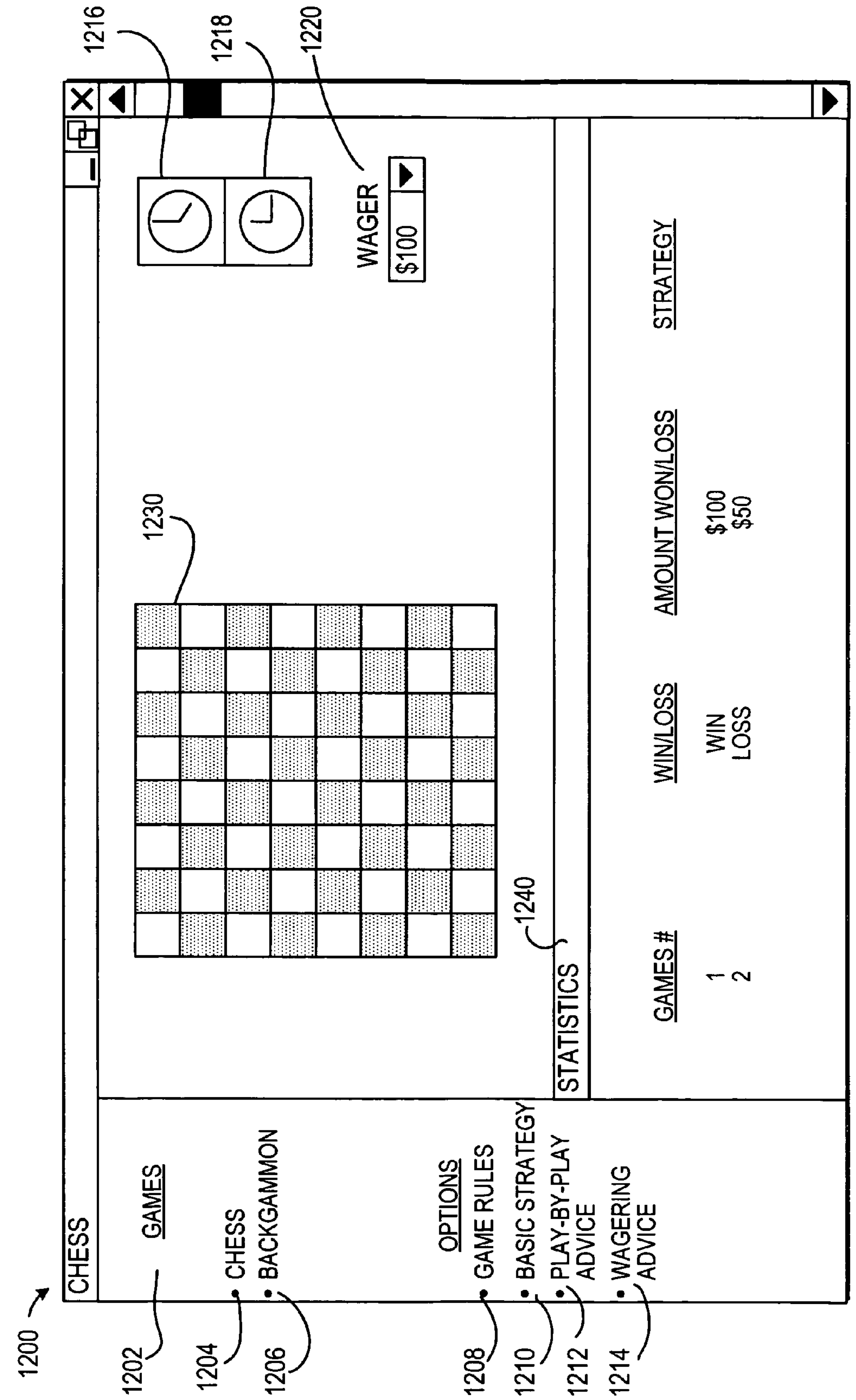
FIG. 12 is an illustrative interactive chess display for a game and wagering assistant system in accordance with various embodiments of the present invention.

Interactive chess display 1200 of FIG. 12 may assist a user in wagering and game play with chess. Display 1200 may be accessed from main menu display 200 by a user selecting chess button 282 from selectable other games list 280. Display 1200 may have a side menu bar 1202. Similarly to menu bar 302, menu bar 1202 may have categories such as games and options. Selectable game menu items may include chess button 1204, backgammon 1206, or any other suitable game. Buttons 1208-1214 may be selected by a user to display game rules, basic strategy, play-by-play advice, wagering advice, or any other suitable information.

A user may select game rules button 1208 in order to display information relating to the rules of chess. Such information may include, for example, descriptions of the rules relating to the movement of the pawn, rook, knight, bishop, queen, and king pieces. Basic strategy button 1210 may be selected in order to display information related to basic strategies and plays. In some embodiments, such information may be geared towards beginning or intermediate chess players.

Play-by-play advice button 1212 may be selected by a user for advice on how to play a particular move, as well as set a strategy for future moves. The game and wagering assistant system may store a database of different plays and strategies, select the most appropriate strategy for a player given the positioning of pieces on the board, and display the strategy to the user on display 1200. Selection of wagering advice button 1214 by a user provides information on how much money a user should wager on a particular game of chess. Factors that may determine how much a user may be advised to wager may be based on the skill level of the player, as well as the skill level and game history of the user's opponent.

Clocks 1216 and 1218 may provide timekeeping for both the user and the user's opponent for a chess game. Wagering window 1220 may allow a user to select an amount of money to wager on the chess game. Again, as discussed above, a user may select wagering advice button 1214 from menu bar 1202 in order to receive advice on what amount should be wagered.

Chess board 1230 may display each player's game pieces (pawns, rooks, knights, bishops, queens, kings). A user may utilize a touch screen, keyboard, microphone, or any other suitable input device in order to move the game pieces on chess board 1230 of display 1200.

Statistics window 1240 may display information related to the number of game wins, losses, the amount of money wagered on each game, the amount of money won or lost from wagering on each game or for all games played, strategies or moves used during each game, or any other suitable information.

Figure 13:
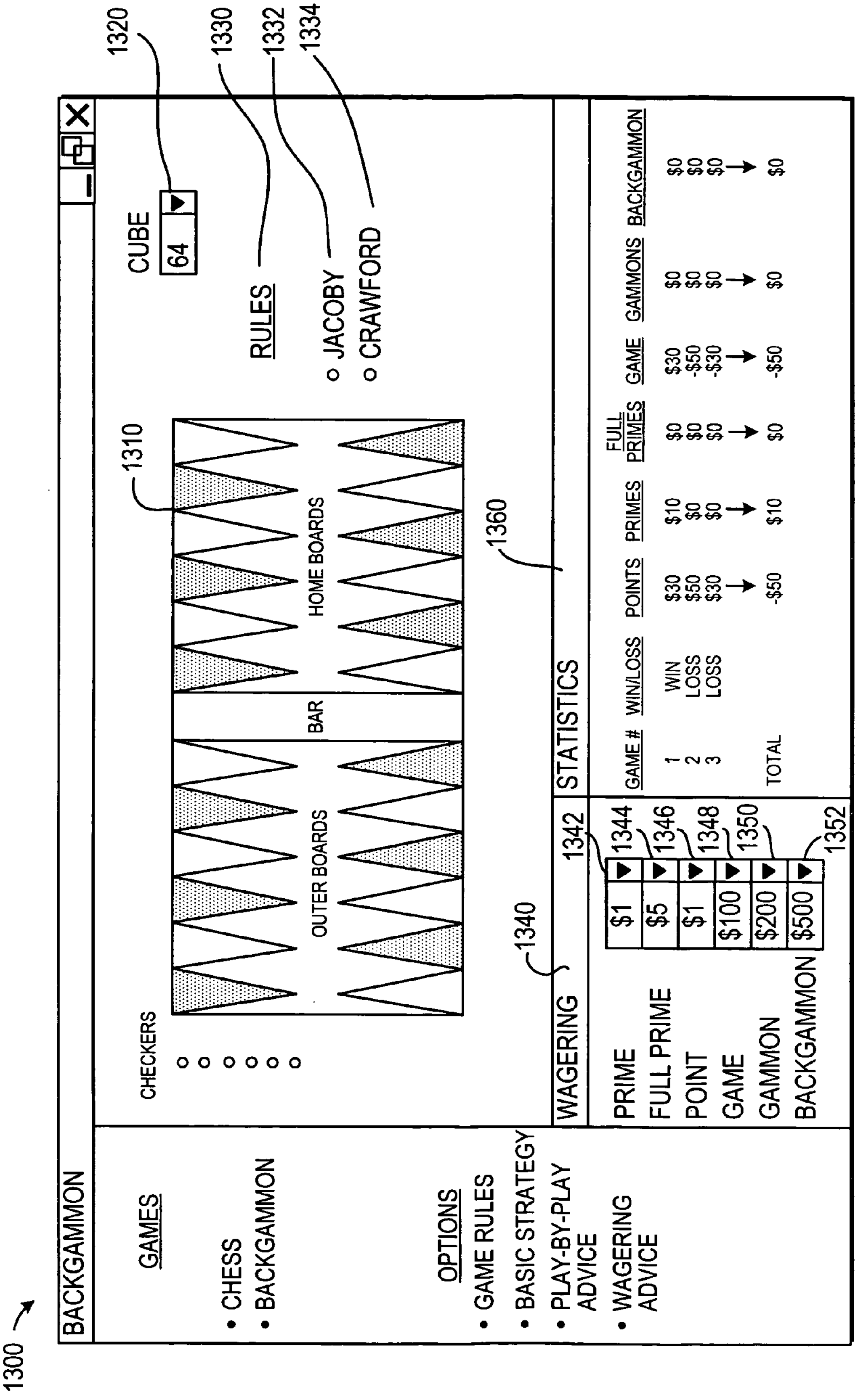
FIG. 13 is an illustrative interactive backgammon display for a game and wagering assistant system in accordance with various embodiments of the present invention.

Turning to FIG. 13, interactive backgammon display 1300 may provide information, as well as game play and wagering advice, relating to backgammon. Display 1300 may have a side menu with similar appearance and functionality to side menu 1202. The selectable options in the side menu of display 1300 such as game rules, basic strategy, play-by-play advice, and wagering advice may present respective displays relating to backgammon.

Backgammon board 1310 may be representative of a traditional backgammon board, with a home board and outer board separated by a bar. Backgammon board may have 24 triangles ("points") in alternating colors. The bar separating the home and outer boards may hold checkers that are out of play until they may enter the opponent's inner board.

Doubling cube 1320 allows a user to select the value of the cube. The user may select from numbers 2, 4, 8, 16, 32, and 64. The cube may be used to keep track of the number of points or units at stake in the game. Typically, at the start of a game, doubling cube 1320 may indicate the number 64, which indicates that the game is being played for one point or unit. If a player feels that they have an advantage during the course of the game, they may choose to double the stakes of the game by changing the value of the cube to the number 2. The opponent of the player desiring to double the stakes of the game may choose to decline the double, or they may choose to accept the double.

Rules selection area 1330 allows a user to indicate whether the backgammon game is to be played an wagered on under the "Jacoby Rule", the "Crawford Rule", or any other suitable rule. Jacoby Rule button 1332 allow a user to indicate that the game to be wagered on will be played under the Jacoby Rule. The Jacoby rule states that the game must be doubled for a gammon or backgammon to count. If the game is not doubled, it counts as a single game. A gammon (double game) is achieved when a player bears off all 15 of his or her men before the opponent has borne off a single man. If one bears off all 15 of one's men before an opponent has borne off a single man, and the opponent still has one or more men in one's home board or on the bar, backgammon (triple game) is achieved. Generally, the Jacoby rule leads to faster play and allows a player to get out of a game that the player will not win. It may also make for a game with quicker doubles and higher stakes. Selection of Crawford Rule button 1334 by the user may indicate that the trailing player may not double for one whole game once the leader is one point away from winning the match. Since the trailer has nothing to lose by doubling every game, it gives the leader one undoubted game to try and finish the match.

Wagering window 1340 may allow a user to track wagers on a backgammon game. Prior to placing wagers, a user may select the wagering advice button located in the side menu to receive advice and options on wagering on backgammon games. Prime wagering window 1342 may allow a user to select or enter a wager for each prime reached. Several points in a row is called a prime. In some embodiments, wagering window 1342 may allow the user to select the number of points in a row that would result in a prime. Full prime window 1344 may allow a user to select or enter a wager for each full prime reached. Six points in a row is considered a full prime.

Point window 1346 in wagering window 1340 may allow a user to place a wager for each point achieved. A player may achieve a point by positioning two or more men on a point (triangle). The player then "owns" the point, and the opponent can neither rest on that point nor touch down on it when taking the combined total of his die roll with one man.

Game window 1350 may allow a user to indicate a wager for a single game. A backgammon game is won when either player bears off all of their men first. If the losing player has borne off at least one checker, the player wins the number of points or units at stake determined by cube window 1320. Gammon window 1358 may allow a user to indicate a wager for gammon (double game). A gammon occurs if the losing player has not borne off any of their checkers. The player wins twice the amount indicated by cube window 1320. Similarly, backgammon window 1352 may allow a user to select a wager for backgammon (triple game). A backgammon occurs when the winner bears off all of their checkers before their opponent is able to bear off any and still has checkers in their opponent's home board or on the bar. The winner would get three times the amount indicated in cube window 1352.

Statistics window 1360 may provide information to the user regarding each backgammon game the user has played. The information displayed in statistics window 1360 may include the amount of money wagered in each game and the amount of money won or lost in each game, as well as the amount of money won or lost on points, primes, full primes, gammon and backgammon.

Figure 14:
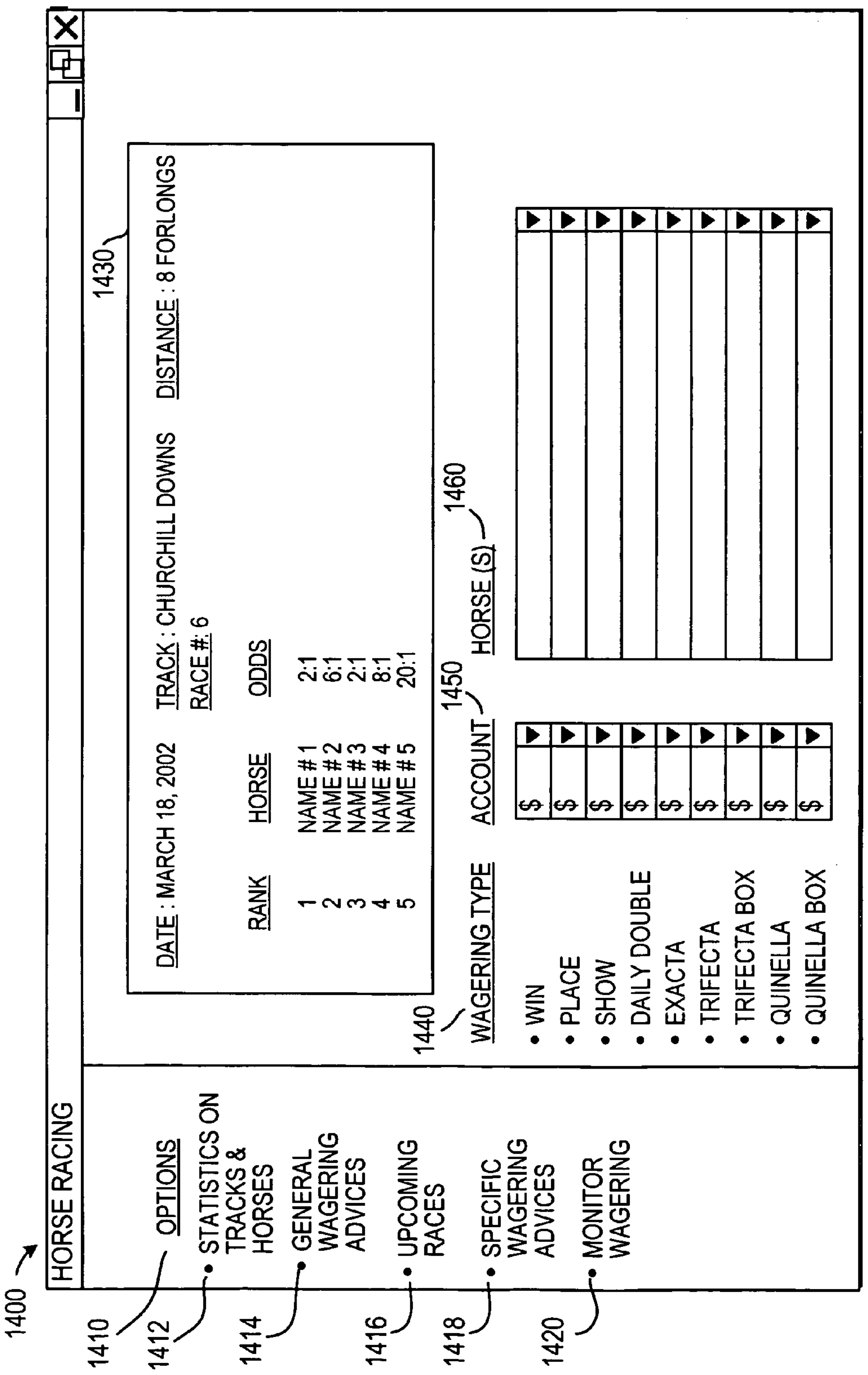
FIG. 14 is an illustrative interactive horse racing display for a game and wagering assistant system in accordance with various embodiments of the present invention.

Interactive horse racing display 1400 of FIG. 14 may assist a user in wagering on horse racing events. Display 1400 may be accessed from main menu display 200 of FIG. 2 by a user selecting horse racing button 292 from selectable wagering events list 290.

Display 1400 may have a side menu bar 1410. Side menu bar 1410 may have a selectable statistics on track and horses button 1412, which may provide a user with a display showing statistics and information on past races and horse performance in those races. Location of the track, track conditions, distance of the race, horses involved in each race and their placing, wagering odds placed on the horses, or any other suitable information may be displayed.

A user may select general wagering advice button 1414 from side menu 1410 in order to obtain advice on wagering on horse races. For example, when general wagering advice button 1414 is selected, a display may present such advice as: when betting straight, restrict bets to win and show only; bet on horses with odds of 5-1 or greater to win and odds 5-1 or less to place; avoid horses that have not raced in the past four week; or any other suitable general wagering advice.

Side menu 1410 may allow a user to select upcoming races button 1416 that may display information on the horse races at tracks are coming up, or any other suitable information.

A user may select specific wagering advice button 1418 to obtain advice on which horse or horses to bet on for a particular race. The game and wager advice system may take into account the past race history of the horses, the specific track, the distance of the race, the odds on particular horses, the level of risk and return desired by a user in making a wager, or any other suitable information. In some embodiments, the game and wager advice system may present advice on which specific horse or horses to wager on, the type of wager to be made (win, place, show, daily double, exacta, trifecta, trifecta box, quinella, quinella box, or any other suitable type), the amount to wager, or any other suitable information. For a win wager, the horse wagered on must place first. For a place wager, the horse must finish first or second. A horse must place first, second, or third for a show wager. For a daily double, a user must select the winning horse of the first and second half of a daily double. Horses selected for an exacta wager must finish first and second in that exact order. For a trifecta wager, the horses must finish first, second, and third in that exact order. For a quinella, the horses selected must finish first and second in either order. A user may select three or more horses for a quinella box wager. A user will win if any two of the selections finishes first and second.

Side menu 1410 may also have a selectable monitor wagering button 1420. If a user selects monitor wagering button 1420, a user may be able to set a total amount that the user wishes to spend on wagers for horse racing, and monitor the rate at which the user loses on wagering.

Horse wagering information window 1430 may provide a variety of information to a user regarding a particular race (or races). The date of the race, the track where the race is being held, the distance of the race, the race number, or any other suitable information may be provided. A listing of horses in the race to wager on may be provided, as well as the wagering odds (e.g., 2:1, 6:1, 8:1, 20:1, etc.) for each horse. In some embodiments, the list of horses may be arranged such that the horses presented at the top of the list have a consistent record and meet a risk/return ratio specified by a user. For instance, a user may wish to select a horse with wagering odds of 6:1, since such a horse might be less likely to win than other horses, but would offer a better payout that horses with odds of, for example, 2:1.

Wagering type window 1440 may allow a user to select one or more wagering types for horse racing wagering. As discussed above in connection with specific wagering advice button 1418, wagering type window may include selectable types win, place, show, daily double, exacta, trifecta, trifecta box, quinella, quinella box, or any other suitable types.

Wagering amount window 1450 may allow a user to select amounts for wagering corresponding to the types of wagers (e.g., win, place, show, daily double, exacta, trifecta, trifecta box, quinella, quinella box, etc.) selected by the user in wagering type window 1440.

Horses window 1460 may allow a user to select horses to correspond to the types of wagers selected in wagering type window 1440, as well as the respective amount for each wager selected in wagering amount window 1450.

As shown by the foregoing, systems and methods for assisting game play and providing wagering advice are provided. It will be understood that the foregoing is merely illustrative of the principles of the invention and that various modifications can be made by those skilled in the art without departing from the scope and spirit of the invention, which is limited only by the claims that follow.

The invention claimed is:

1. A method for providing wagering information, comprising:

displaying at a computing device a list comprising a plurality of games, each of the games selectable for initiating game play on the computing device;

receiving a selection from a user of at least one of the plurality of games;

displaying on the computing device an interface screen associated with the selected game in response to the selection;

receiving from the user at least one game play command and a plurality of wagers during multiple game plays of at least the selected game;

determining based on the plurality of wagers an amount of money risked by the user over a period of time;

determining at least one complimentary good or service earned by the user based on the amount of money risked by the user over the period of time;

determining a value of at least one of wins and losses sustained by the user based at least on an outcome of each of the plurality of wagers; and displaying on the computing device the at least one complimentary good or service earned by the user, a value of the at least one complimentary good or service earned by the user, and the value of the at least one of wins and losses sustained by the user.

2. The method of claim 1, further comprising monitoring the rate at which the user is losing money by wagering using, at least in part, the computing device, and displaying on the computing device the rate at which the user is losing money.

3. The method of claim 1, further comprising receiving a plurality of wagers from the user and providing wagering advice for a later of the plurality of wagers based at least in part on an outcome of an earlier of the plurality of wagers.

4. The method of claim 3, wherein the wagering advice provided comprises advice to increase or decrease a wager.

5. The method of claim 1, wherein the computing device comprises a speech recognition component, the method further comprising receiving voice input during game play and recognizing with the computing device at least one of the at least one game play command and the at least one wager from the voice input.

6. The method of claim 1, wherein the computing device comprises a handheld device communicatively coupled over a wireless network to at least one server over a wireless network, the complimentary goods and services earned by the user communicated to the handheld device from the at least one server computer.

7. A method comprising:

displaying on a display screen of a handheld computing device an interface screen associated with a game, the handheld device communicatively coupled over a wireless network to at least one server;

receiving from the user at least one game play command and a plurality of wagers during multiple game plays of at least the selected game;

determining based on the plurality of wagers an amount of money risked by the user over a period of time;

determining at least one complimentary good or service earned by the user based on the amount of money risked by the user over the period of time;

determining a value of at least one of wins and losses sustained by the user based at least on an outcome of each of the plurality of wagers;

receiving from the at least one server the at least one complimentary good or service earned by the user based, a value of the at least one complimentary good or service earned by the user, and the value of the at least one of wins and losses sustained by the user; and displaying on the display screen of the handheld device the at least one complimentary good or service earned by the user, the value of the at least one complimentary good or service earned by the user, and the value of the at least one of wins and losses sustained by the user.

8. The method of claim 7, wherein the handheld device comprises a speech recognition component, the method further comprising receiving voice input during game play and recognizing with the computing device at least one of the at least one game play command and the at least one wager from the voice input.

9. The method of claim 1, wherein the value of the at least one complimentary good or service is displayed as a monetary value.

10. The method of claim 1, wherein the at least one complimentary good or service earned by the user is further based on a percentage of the amount of money risked by the user that a gaming provider expects to win.

11. The method of claim 1, wherein the percentage comprises a gaming provider advantage associated with the selected game.

12. The method of claim 1, wherein the value of wins sustained by the user is displayed, and wherein the value of wins is determined exclusive of any losses sustained by the user.

13. The method of claim 1, wherein the value of losses sustained by the user is displayed, and wherein the value of losses is determined exclusive of any wins sustained by the user.

14. The method of claim 1, wherein the at least one complimentary good or service earned by the user is further determined based at least on the user's losses.

15. The method of claim 1, in which the act of displaying on the computing device the at least one complimentary good or service earned by the user, a value of the at least one complimentary good or service earned by the user, and the value of the at least one of wins and losses sustained by the user comprises:

electronically displaying on a display screen of the computing device the at least one complimentary good or service earned by the user, a value of the at least one complimentary good or service earned by the user, and the value of the at least one of wins and losses sustained by the user.

16. The method of claim 1, in which the act of determining a value of at least one of wins and losses sustained by the user based at least on an outcome of each of the plurality of wagers comprises: determining a value of losses sustained by the user based at least on an outcome of each of the plurality of wagers; and in which the act of displaying on the display screen of the computing device (i) the at least one complimentary good or service earned by the user, (ii) a value of the at least one complimentary good or service earned by the user, and (iii) the value of the at least one of wins and losses sustained by the user comprises: displaying on the display screen of the computing device the value of the losses.

17. The method of claim 7, wherein the value of the at least one complimentary good or service is displayed as a monetary value.

18. The method of claim 7, wherein the at least one complimentary good or service earned by the user is further based on a percentage of the amount of money risked by the user that a gaming provider expects to win.

19. The method of claim 7, wherein the percentage comprises a gaming provider advantage associated with the selected game.

20. The method of claim 7, wherein the value of wins sustained by the user is displayed, and wherein the value of wins is determined exclusive of any losses sustained by the user.

21. The method of claim 7, wherein the value of losses sustained by the user is displayed, and wherein the value of losses is determined exclusive of any wins sustained by the user.

22. The method of claim 7, wherein the at least one complimentary good or service earned by the user is further determined based at least on the user's losses.

23. The method of claim 7, in which the act of displaying on the electronic display of the computing device (i) the at least one complimentary good or service earned by the user, (ii) a value of the at least one complimentary good or service earned by the user, and (iii) the value of the at least one of wins and losses sustained by the user comprises:

simultaneously displaying on the electronic display the value of the at least one complimentary good or service earned by the user and the value of the at least one of wins and losses sustained by the user.

24. The method of claim 7, in which the act of determining a value of at least one of wins and losses sustained by the user based at least on an outcome of each of the plurality of wagers comprises: determining a value of losses sustained by the user based at least on an outcome of each of the plurality of wagers; and in which the act of displaying on the display screen of the computing device (i) the at least one complimentary good or service earned by the user, (ii) a value of the at least one complimentary good or service earned by the user, and (iii) the value of the at least one of wins and losses sustained by the user comprises: displaying on the display screen of the computing device the value of the losses.

25. A system comprising:

at least one processor; and at least one memory that stores instructions which, when executed by the at least one processor, direct the at least one processor to:

display at an electronic display of a computing device a list comprising a plurality of games, each of the games selectable for initiating game play on the computing device;

receive a selection from a user of at least one of the plurality of games;

display on the computing device an interface screen associated with the selected game in response to the selection;

receive from the user at least one game play command and a plurality of wagers during multiple game plays of at least the selected game;

determine based on the plurality of wagers an amount of money risked by the user over a period of time;

determine at least one complimentary good or service earned by the user based on the amount of money risked by the user over the period of time, in which the at least one complimentary good or service is separate from any winnings sustained by the user based at least on an outcome of any of the plurality of wagers;

determine a value of losses sustained by the user based at least on an outcome of each of the plurality of wagers; and display on the electronic display of the computing device (i) the at least one complimentary good or service earned by the user, (ii) a value of the at least one complimentary good or service earned by the user, and (iii) the value of the losses sustained by the user.

* * * * *